(12) United States Patent
Gibson et al.

(10) Patent No.: US 12,498,228 B1
(45) Date of Patent: Dec. 16, 2025

(54) DETECTING AND RESOLVING DISPARITIES BETWEEN MAP DATA AND ENVIRONMENTS PERCEIVED BY SENSOR SYSTEMS

(71) Applicant: Zoox, Inc., Foster City, CA (US)

(72) Inventors: Christopher James Gibson, Belmont, CA (US); Chelsea Lauran Williams, San Jose, CA (US)

(73) Assignee: Zoox, Inc., Foster City, CA (US)

( * ) Notice: Subject to any disclaimer, the term of this patent is extended or adjusted under 35 U.S.C. 154(b) by 337 days.

(21) Appl. No.: 17/853,699

(22) Filed: Jun. 29, 2022

(51) Int. Cl.
*G01C 21/32* (2006.01)
*B60W 50/00* (2006.01)
*B60W 60/00* (2020.01)

(52) U.S. Cl.
CPC ............. *G01C 21/32* (2013.01); *B60W 50/00* (2013.01); *B60W 2050/0083* (2013.01); *B60W 60/001* (2020.02); *B60W 2552/45* (2020.02); *B60W 2552/53* (2020.02); *B60W 2554/00* (2020.02); *B60W 2555/60* (2020.02)

(58) Field of Classification Search
CPC .... G01C 21/32; B60W 50/00; B60W 2554/00
See application file for complete search history.

(56) References Cited

U.S. PATENT DOCUMENTS

| | | | |
|---|---|---|---|
| 2017/0277716 A1* | 9/2017 | Giurgiu | ................... G06F 16/29 |
| 2021/0327092 A1* | 10/2021 | Jiang | ..................... B60W 40/02 |
| 2022/0242352 A1* | 8/2022 | Nagata | .............. B60R 21/01534 |
| 2023/0377451 A1* | 11/2023 | Murray | ............... B60R 25/1003 |

* cited by examiner

*Primary Examiner* — Andrea C Leggett
(74) *Attorney, Agent, or Firm* — Lee & Hayes, P.C.

(57) ABSTRACT

Techniques are discussed herein for detecting and resolving disparities between sensor data perceived by sensor-based systems operating in an environment and corresponding map data of the environment. Sensor data may be captured by a vehicle or other sensor system operating in an environment, including representations of objects at various locations in the environment. The object representations may be used to determine disparities between the sensor data and map data associated with the same locations. Such disparities may be caused by, for example, physical changes in the environment, map data changes, and/or localization errors of the sensor system. The techniques discussed herein further include analyzing the map data and sensor data to determine causes associated with the disparities, and resolving the disparities by updating the map data and/or transmitting updated sensor configuration data to sensor systems in the environment.

20 Claims, 8 Drawing Sheets

DETECTING AND RESOLVING DISPARITIES BETWEEN MAP DATA AND ENVIRONMENTS PERCEIVED BY SENSOR SYSTEMS

BACKGROUND

Vehicles are increasingly supplementing or replacing manual functionality with automatic controls. Autonomous driving functionality such as vehicle navigation may benefit from on-board computing systems capable of making split-second decisions to respond to myriad events and scenarios, including determining trajectories through environments and reactions of the vehicle to dynamic events. To navigate safely and efficiently through a driving environment, a vehicle may use map data including a representation of a road network corresponding to the current location of the vehicle. The navigation systems of the vehicle may use the map data to accurately guide the vehicle through the road network. The map data may include a road network comprising data structures storing information about roads, traffic signs and signals, and other objects in the driving environment. Information stored in the road network may include properties of the individual roads and features within them, intersections and relationships between roads, and other characteristics associated with the roads, etc.

In some cases, one or more of the map data used by the vehicle, the sensor configuration of the vehicle, and/or the driving environment itself may change. Such changes can cause disparities between the map data and the driving environment as perceived by the vehicle sensors, thus rendering the map data unsuitable for use by the vehicle. Identifying and performing the necessary updates to the map data and/or sensor configuration of vehicles to resolve such disparities may be technically difficult and costly.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
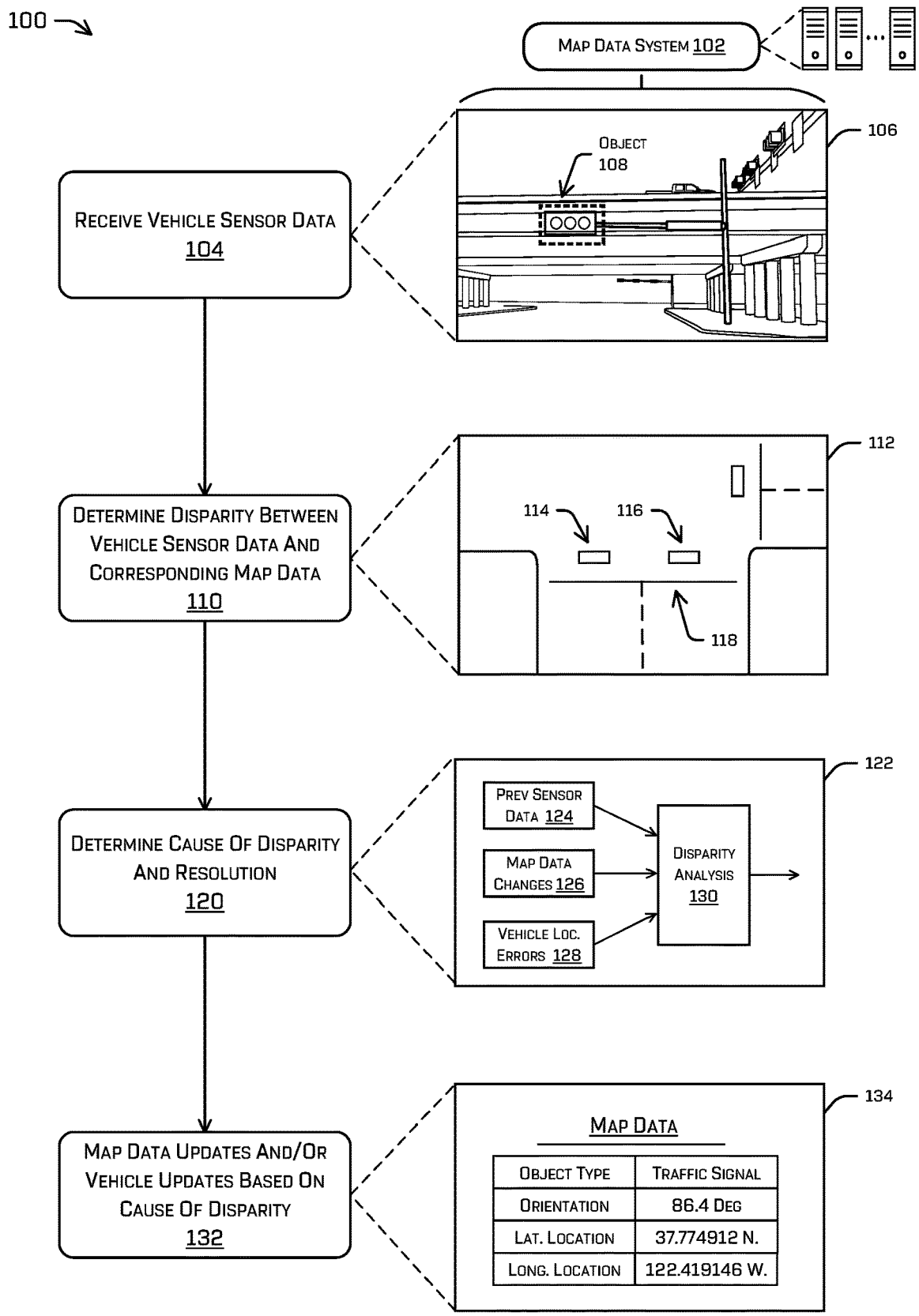
FIG. 1 illustrates an example technique of detecting and resolving a disparity between sensor data perceived a vehicle and corresponding map data, in accordance with one or more implementations of the disclosure.

This application relates to detecting and resolving disparities between sensor data perceived by vehicles or other sensor-based systems operating in real-world environments, and corresponding map data of the environments. In some examples, vehicle sensor data may be received including images and/or other sensor data representing objects at various locations in a driving environment. A map data system may maintain map data of the driving environment, including a road network storing object data and associated locations for road segments, traffic signals and signs, sidewalks, crosswalks, and/or other objects in the environment. In at least some examples, such map data may comprise road network data and/or topographical data (e.g., a mesh) of the environment. In some examples described herein, the map data system may analyze the vehicle sensor data and the corresponding map data to determine various disparities (e.g., topology differences, policy differences, object misalignments, etc.) between the vehicle sensor data and the associated map data. Such disparities may have a number of potential causes, for example, a previous change to the map imagery data, an error introduced during a map annotation, calibration errors, localization errors caused by sensor configurations on the vehicle, and/or changes that have occurred in the physical environment. As discussed in various examples herein, the map data system may analyze the images (and/or other sensor data) captured by the vehicle and the corresponding map data to determine the causes of the disparities. The map data system also may determine and attempt to resolve or mitigate the disparities, which may include updating the map data and/or the sensor configuration data for vehicles operating in the environment, flagging the associated area for additional mapping, flagging the sensor data as unreliable in the area, and the like. The updated map data, sensor configuration data, and/or other vehicle navigation data may be transmitted to vehicles in the driving environment, and used to control the movements and navigation of the vehicles. As a non-limiting example, vehicles in the area may collect additional data for updating the map and/or drive more cautiously (including avoiding the area) based on the information.

In certain examples, the map data system may be configured to receive and analyze sensor data acquired by vehicles while traversing driving environments. The vehicle sensor data may include image data representing various objects in the environment. The objects may include, for example, objects such as road segments, road features, lane markers, traffic signs and signals, crosswalks, curbs, sidewalks, buildings, etc. Although some examples herein include receiving and analyzing image data captured by a vehicle, in other examples the vehicle sensor data may include any additional or alternative sensor data types/modalities (e.g., lidar data, radar data, sonar data, etc.) representing roads and other objects in a driving environment.

One or more vehicles using map data to navigate an environment may capture or acquire image data (and/or other sensor data) while traversing the environment. In some cases, the map data used by the vehicles may be generated and maintained by a separate map data system configured to store and update the current map data for the driving environment, and to transmit portions of the map data to vehicles as they move to various locations in the environment. In some cases, an onboard computer of the vehicle may flag the image data (or other sensor data) when it detects a potential disparity between the image data and the map data. For example, the vehicle may flag particular image data associated with an object when the object detected in the image data does not correspond to an object in the map data, when an object in the map data is not detected in the image data, or when an object in the image data appears to have a different location or other attributes than the corresponding object in the map data. In such examples, the vehicle may provide the flagged image data to the map data system to analyze the potential disparity between the image data captured by the vehicle and the current map data for that location in the environment. In other examples, the vehicle need not flag or provide any particular image data or sensor data, but rather the map data system may receive sensor data from any number of vehicles and analyze the vehicle sensor data to detect disparities with the map data. For instance, the map data system may retrieve vehicle sensor data associated with a particular driving incident or anomaly (e.g., a moving violation, accident or near-miss accident, vehicle malfunction, etc.), to determine whether a disparity between the map data and the perceived environment in the vehicle sensor data was a potential cause of the incident or anomaly.

When receiving image data (and/or other sensor data) acquired by a vehicle operating in the environment, the map data system may analyze the image data to determine whether a disparity exists between the image data and the map data, and to determine one or more potential causes and/or resolutions of the disparity. In various examples, disparities between a driving environment perceived by a vehicle at a location and the map data at the corresponding location may be caused by changes or regressions to the map data (e.g., annotation errors, updated imagery), localization errors on the vehicle, and/or real-world changes to the physical environment. As a non-limiting example, after localizing a vehicle with respect to a map, a traffic control device (e.g., traffic light, traffic sign, etc.) stored in such map data may be projected into the acquired image data. Disparities may be calculated, for example, such as relative location, size, orientation, color, etc. between the projected data and the sensor data. Depending on the disparities detected between the vehicle sensor data and the map data, as well as the potential causes of the disparities, the map data system may determine one or more resolutions to address the disparities. For instance, resolutions performed by the map data system may include initiating automated and/or user interface-based updates to the map data at a particular location, determining vehicle navigation data and/or control instructions for one or more vehicles, and transmitting the updated map data or other navigation data to vehicles in the driving environment.

The techniques described herein for detecting, analyzing, and resolving disparities between vehicle sensor data and corresponding map data can improve the functioning of computing devices, including autonomous vehicle systems and separate map data systems. For instance, the techniques described herein can provide faster and more efficient detection of map data inaccuracies and changes in real-world driving environments, as well as updating of map data to address the map inaccuracies or environment changes. Additional techniques include providing the updated map data and/or updated sensor configuration data to vehicles operating in the driving environment, thereby allowing the vehicles to perform driving operations with reduced difficultly and cost. For instance, the updated and improved map data provided to the vehicle can allow subsequent driving operations on the vehicle, such as localization, perception (e.g., detecting, identifying, segmenting, classifying, tracking, etc.), route planning, trajectory generation, and the like to be performed more accurately while requiring less manual intervention and less disruption to the operation of the vehicle. Faster and more accurate map updates also can be used to generate autonomous vehicle trajectories more quickly, which reduces driving disruptions and shortens the window in which manual override may be needed to respond to changes in the environment. Thus, the techniques described herein improve the overall functioning, safety, and efficiency of autonomous and semi-autonomous vehicles operating in real-world driving environments, by more quickly detecting and resolving map data inaccuracies and/or localization errors, reducing the times that such issues may cause the vehicle to perform inappropriate actions.

The techniques described herein may be implemented in a number of ways. Example implementations are provided below with reference to the following figures. Although discussed in the context of image data or other sensor data perceived by autonomous vehicles, the methods, apparatuses, and systems described herein may be applied to a variety of systems (e.g., a sensor system or a robotic platform), and are not limited to autonomous vehicles. Similar or identical techniques to those described herein may be applied to detecting and resolving disparities between current map data and sensor data perceived or acquired by any other sensor-based system operating in a physical environment, such as traffic camera systems, security systems, mobile devices including sensors configured to acquire data of the surrounding environment, etc. Additionally, similar techniques may be utilized in driver-controlled vehicles in which such a system may provide an indication of whether it is safe to perform various maneuvers. In other examples, the techniques described herein also may be utilized in an aviation or nautical context.

FIG. 1 depicts an example process 100 of detecting and resolving a disparity between sensor data perceived by a vehicle operating in an environment, and corresponding map data of the environment. In various implementations, some or all of the operations in process 100 may be performed by a map data system 102 configured to receive and analyze sensor data from any number of vehicles, and to update the current map data for the environment based on the vehicle sensor data. Additionally or alternatively, some or all of the operations in process 100 may be performed by the vehicle itself. For example, a map data system/component on the vehicle may be configured to detect and resolve disparities between map data received from an external map data source and the corresponding driving environment perceived by the vehicle sensors.

At operation 104, a map data system 102 may receive vehicle sensor data associated with one or more vehicles operating in a real-world driving environment. As used herein, vehicle sensor data may include any data acquired by a vehicle representing or describing the physical environment in which the vehicle is operating. The vehicle sensor data received in operation 104 may include vehicle log data (e.g., when used off-line) and/or other data captured by the sensors of the vehicles, as well as additional data determined or derived based on the vehicle logs/sensor data. In particular, the vehicle sensor data in this example may include data representing the road network of the driving environment (e.g., road segments, road features, lane boundary markers, etc.) and/or any other enduring or long-lived objects within the environment. Such enduring or long-lived objects in the environment may include, for example, traffic lights/signals, traffic signs, crosswalks, curbs, sidewalks, buildings, trees, fire hydrants, mailboxes, and/or other any object that may be represented as a feature within map data of the environment. Such enduring objects may be referred to herein as static objects to differentiate from those objects that are capable of movement, or dynamic objects, such as vehicles, pedestrians, etc.

The vehicle sensor data received in operation 104 may include images (and/or other sensor data) captured by cameras (and/or other sensor types) on the vehicle and transmitted to the map data system 102. For instance, box 106 depicts an image representation captured by a vehicle traversing a driving environment. In this example, an object 108 (e.g., a traffic signal) is represented in the image data. The image data (and/or other sensor data) received in operation 104 may represent the location of the object 108, as well as other features or characteristics (e.g., object size, orientation, features, etc.) of the object 108 and/or other objects in the environment. In some cases, an onboard computer of a vehicle may capture and transmit image data and/or other sensor data of an object to the map data system 102, when it detects a potential disparity between the object as perceived in the environment and the corresponding object represented in the map data used by the vehicle to navigate the environment. In other examples, the map data system 102 may request and/or receive vehicle logs including images and/or other sensor data associated with particular driving incidents or anomalies (e.g., moving violations, accidents or near-miss accidents, vehicle malfunctions, etc.), and may analyze the sensor data captured by the vehicle to determine whether a disparity between the map data and the vehicle sensor data was a potential cause of the incident or anomaly.

In some examples, the map data system 102 may receive the vehicle sensor data in real-time or near real-time, that is, when the vehicle that captured the sensor data is still in the proximity of the roads/objects represented in the sensor data. In such examples, the map data system 102 may be configured to detect and resolve potential disparities between the vehicle sensor data and the corresponding map data in a relatively short time period (e.g., 0.5 secs, 1 sec, 5 secs, etc.), and may provide updated data to resolve the disparity (e.g., updated map data, updated sensor configuration data, etc.) to the same vehicle that captured the sensor data so that the updated data may be used by the vehicle while traversing the same environment.

In other examples, the vehicle sensor data in operation 104 may be received at a later time, for instance, when the vehicle that captured the sensor data is no longer in the proximity of the same location. In these examples, after detecting and resolving a disparity between the vehicle sensor data and the corresponding map data, the map data system 102 may provide the updated data to resolve the disparity (e.g., updated map data, updated sensor configuration data, etc.) to the same vehicle and/or to different vehicles operating in the environment. For instance, updated map data associated with a particular location in the environment may be provided to other vehicles approaching or in the vicinity of the location, at a time after the vehicle captured the sensor data is no longer at the same location. Additionally, in some cases, the map data system 102 may receive and aggregate multiple sensor data (e.g., multiple images) representing the same object in the environment. The multiple sensor data may include data captured by a single vehicle or by different vehicles, at the same time or over a period of time. As described below in more detail, receiving multiple sensor data representing the same object may allow the map data system 102 to analyze the object more effectively from different angles (e.g., to determine lateral and longitudinal positions), at different times and/or in different driving conditions (e.g., wind and other weather conditions, time of day and lighting conditions, etc.), in order to better identify disparities between the perceived object in the environment and the corresponding map data.

Although this example describes receiving sensor data acquired by vehicles traversing an environment, in other examples the sensor data received in operation 104 may include sensor data captured or acquired by any other sensor system operating in an environment. Examples of such sensor systems may include, but are not limited to, traffic cameras, building or location security systems, and/or mobile devices (e.g., smartphones, tablet computers, smart watches, wearable computing devices, etc.) including sensors configured to perceive objects in the environment, etc. Such sensor systems may be used as an alternative or in combination with vehicles in various examples.

At operation 110, the map data system 102 may analyze the vehicle sensor data received in operation 104 to determine a disparity between one or more perceived objects represented in the sensor data, and the corresponding representations of the object in the map data. In some examples, a perception component of the map data system 102 may detect one or more objects (e.g., object 108) in the image data. The detected objects may be identified in a single image frame and/or tracked over multiple image frames (e.g. multiple frames of video or multiple still image frames). In some cases, the map data system 102 may use multiple sensor data from multiple sensor modalities (e.g., image data, lidar data, radar data, etc.) and/or sensor data from multiple vehicles to determine the perceived location, size, orientation of the object, etc. which may, in at least some examples, comprise filtering the sensor data and/or detections (e.g., Kalman filter, averaging, other Bayesian filters, etc.). Based on the various sensor data, a projection component of the map data system 102 may determine a location, size, and orientation for the object in the coordinate system of the map data. Of course, such an operation may be performed in reverse whereby the road network data is projected into the associated sensor data to compare. In some cases, the map data system 102 also may classify the detected object (e.g., as a road sign, a traffic signal, a road segment or lane, etc.) and/or perform semantic analysis of the object to determine one or more driving policies associated with the object (e.g., road sign directives, speed limits, roadway permissibility, restrictions on lane use, etc.). Additional techniques and examples for analyzing vehicle sensor data, detecting objects, and projecting the objects into corresponding locations in the map data coordinate system are described, for example, in U.S. Pat. No. 11,280,630, filed Nov. 27, 2019, and entitled "Updating Map Data," the entire contents of which are incorporated herein by reference for all purposes.

The map data system 102 may determine disparities associated with perceived objects in the vehicle sensor data, by comparing the locations, types, and other attributes of the objects to the map data at the corresponding location. For example, box 112 depicts a top-down view of map data of the same location as the image data shown in box 106. In this example, the map data shown in box 112 includes representations of a first traffic signal 114 and a second traffic signal 116 in the intersection, as well as a representation of a stop line 118 in front of the intersection. In this example, the map data system 102 may detect a disparity if an object corresponding to the type and location of object 108 is not represented in the map data shown in box 112, and/or if the representations of the first traffic signal 114, second traffic signal 116, and stop line 118 do not correspond to the sensor data shown in box 106.

In various examples, the map data system 102 may determine various different types of disparities between perceived objects and the corresponding map data, or vice versa, between a map data object and the perceived environment. For example, a topology disparity (which also may be referred to as a map layout disparity) may include an instance when an object (or object feature) detected in the vehicle sensor data does not appear in the map data. An alignment disparity (or location disparity) may refer to instances in which an object detected in the environment is represented in the map data, but the object appears at a different location and/or different orientation than the map data representation of the object. A policy disparity (or semantic disparity) may refer to instances in which an object detected in the environment is represented in the map data, but a traffic directive or other semantic meaning (e.g., a speed limit of a road segment, lane usage or permissibility, etc.) of the object is different from the traffic directive or semantic meaning of the corresponding object in the map data.

At operation 120, the map data system 102 may determine a cause of a disparity between a perceived object and the corresponding map data. As noted above, a disparity in which an object perceived using sensor data from a location in the environment is not represented in the map data associated with the location, is represented at a different location or orientation in the map data, or is represented in the map data as having different semantic features/traffic directives, etc., may have a number of potential causes. For example, a disparity between a perceived object and the corresponding map data may be caused by an inaccurate or erroneous annotation (or label) made to the map data by an automated labeling process or by a user. For instance, mislabeling of an object type or mislocating an object within the map data can result in the vehicle and/or map data system 102 detecting a disparity.

In other examples, a disparity may be caused when the map data is updated based on new map imagery. For example, when new map imagery is received for a portion of the physical environment represented by the map data, the map data system 102 may perform a number of automated processes to modify the existing map elements to comport with the updated map imagery. For example, such processes may include transforming the map data by warping the existing map elements so that they correspond to the updated map imagery. Additional techniques and examples for warping map points and map elements based on updated map imagery data are described, for example, in U.S. Pat. No. 10,782,136, filed Sep. 28, 2018, and entitled "Modifying Map Elements Associated With Map Data," the entire contents of which are incorporated herein by reference for all purposes. During such processes, positional misalignments or other types of disparities may be introduced, either by the updated map imagery and/or by the map element warping performed to update map elements based on the updated imagery.

In still other examples, a disparity between a perceived object and the corresponding map data may be caused by a localization error occurring on the vehicle that acquired the sensor data. Such localization errors, such as tracking errors and/or sensor calibration errors, may include any errors occurring in the vehicle that prevent the vehicle from accurately and reliably determining its own location relative to the map data being used by the vehicle to traverse the environment. In some examples, localization errors may be reported in vehicle log data and/or may be provided to the map data system 102 as a magnitude of the localization error accumulated by the vehicle as it traverses the environment and/or as a confidence level in the localized position of the vehicle relative to the map data. As the localization error for a vehicle accumulates as the vehicle operates in the environment, the accumulated localization error may result in positional misalignments or other types of disparities between the perceived objects and map data. Additionally or alternatively, such disparities may be caused by calibration errors on the vehicle, including errors in sensor configuration and/or calibration operations on the vehicles, stale sensor configuration data, etc.

In additional examples, a disparity may be caused by changes to the physical environment itself. Such changes may include the construction of new road features (e.g., curbs, sidewalks, medians, etc.), the widening or alteration of roads, lane repainting and/or reconfiguration, the addition of new traffic signs or signals, the removal or replacement of existing traffic signs or signals, adjustments to the drivable road surface, and/or any other changes to the physical objects represented in the map data. When any such changes to the physical environment occur after the generation and/or annotation of the map data, these changes may cause the map data to become outdated and may result in disparities between the perceived objects and map data.

To determine a potential cause of a disparity between a perceived object and the corresponding map data, the map data system 102 may receive and analyze various data associated with the map data, the vehicle sensor data, and/or the vehicle at which the sensor data was acquired. For example, box 122 depicts a simplified system for determining a cause of a disparity between perceived object data and corresponding map data. In this example, the map data system 102 may include a disparity analysis component 130 configured to determine potential causes of the disparity based on various input data, including previous sensor data 124, previous map data changes 126, and/or vehicle localization error data 128. The previous sensor data 124 may include data related to previous instances when a vehicle (or other sensor system) acquired data representing the same perceived object for which the disparity was detected. For example, the previous sensor data 124 may include a most recent time when previous sensor data acquired of the same object and/or location did not result in the detection of a disparity. The previous map data changes 126 may include any previous changes to the map data associated with the object for which the disparity was detected and/or the corresponding location. For instance, previous map data changes 126 may include data identifying the times of previous map data changes and types of the changes (e.g., map imagery changes, map element warping processes, annotation/labeling changes to objects, etc.). The vehicle localization error data 128, as described above, may include the localization error (e.g., amount of accumulated localization error and/or confidence in localized sensor position) associated with the vehicle sensor data.

As described above, the previous sensor data 124 may include data related to previous instances in which sensor data was captured representing the same perceived object. As an example, the previous sensor data 124 may include a time at which previous sensor data was captured of an object, when the map data system 102 determined that there was substantially no disparity (e.g., a location disparity below a distance threshold) between the previous sensor data and the corresponding map data at the previous time.

Additionally or alternatively, the previous sensor data 124 may include one or more different locations at which previous sensor data was captured by the same vehicle/sensor system. For example, in the same vehicle log data from which a disparity is detected, the map data system 102 may determine one or more previous and/or subsequent locations at which sensor data was captured. Such locations may include previous or subsequent image frames, road segments, intersections, etc., and may be adjacent to or otherwise proximate to the location where the disparity was detected. The map data system 102 may determine, for the different locations, whether the same or a similar disparity exists, or whether there is substantially no disparity between the objects and the corresponding map data at the different locations. In such examples, when the previous and/or subsequent locations have substantially no disparity from the corresponding map data, the map data system 102 may determine that a potential cause of the disparity is, for instance, a physical environment change at the location, a map mislabeling at the location, and/or an error in a map element warping process that affected the location of the disparity but not the previous or subsequent locations.

Further, in some examples, the map data system 102 may determine that at a particular location (e.g., a particular image frame, road segment, intersection, etc.) there are multiple perceived objects for which a disparity is detected. In such examples, the detection of disparities for multiple objects may indicate that a potential cause is an error on the vehicle (e.g., a calibration error, localization error, etc.) and/or an error in the map imagery or a map element warping process affecting the location. In contrast, when the map data system 102 detects a disparity for one object at a location but not for some or all of the other objects at the same location, the map data system 102 may determine that the cause of the disparity is more likely to be a change to the object in the physical environment and/or a mislabeling of the object within the map data.

When a disparity is identified at a location in the environment, the map data system 102 may use the same sensor data (e.g., the same vehicle log) to evaluate one or more other objects at or near the location, to determine whether the disparity also affects the other objects. In some examples, the map data system 102 may project the measured data (e.g., the perceived sensor data) and the expected data based on the corresponding map data into a common reference frame (e.g., a 2D or 3D spatial representation and/or multi-dimensional vector space). The map data system 102 may use the distance in the common reference frame between the measured data and expected data for the first object to determine a first disparity amount for the first object, and may use the distance in the common reference frame between the measured data and expected data for a second different object to determine a second disparity amount for the second object. When the difference between the disparity amounts for the objects is greater than a disparity threshold, the map data system 102 may determine one or more potential causes of the disparity (e.g., a physical environment change, a mislabeling of an object in the map data, etc.). In contrast, when the difference between the disparity amounts is less than the threshold, indicating a similar disparity for multiple object at the same location, the map data system 102 may determine different potential causes of the disparity (e.g., a vehicle localization or calibration error, an error in a map element warping process, etc.).

The disparity analysis component 130 in this example may use various combinations of the previous sensor data 124, the previous map data changes 126, and/or vehicle localization error data 128 to determine one or more potential causes of a disparity. As an example, when the previous sensor data 124 is analyzed to determine that sensor data acquired at a previous time did not indicate a disparity, and the previous map data changes 126 indicate that the map imagery and the annotated map data have not changed since the time of the previous sensor data, the disparity analysis component 130 may determine that the potential cause of the disparity is a change to the physical environment. As another example, when the disparity relates to an object that has been changed by a map data labeling/annotation change more recent than the previous sensor data, the disparity analysis component 130 may determine that the cause of the disparity is a semantic regression caused by the map data labeling/annotation change. As another example, when a map imagery update and/or map element warping process has been performed at the location of the object, at a time more recent than the previous sensor data, the disparity analysis component 130 may determine that the cause of the disparity is the imagery update and/or subsequent map element warping. As yet another example, when the vehicle sensor data indicates a relatively low confidence in the sensor calibration/tracking systems of the vehicle that acquired the sensor data, and/or if none of the other potential disparity causes are determined to be likely, the disparity analysis component 130 may determine that the likely cause of the disparity is the localization error of the vehicle.

Additionally or alternatively to determining a cause of the disparity between the perceived object/environment and the map data, the map data system 102 in operation 120 also may determine one or more resolutions to address the disparity. In some examples, the resolutions determined by the map data system 102 may be based on the determined cause of the disparity, and/or other factors such as the disparity type (e.g., topology differences, policy differences, object misalignments, etc.) or the severity of the disparity. For instance, the resolutions determined by the map data system 102 in operation 120 may include one or a combination of map data updates, sensor reconfigurations on vehicles, and/or navigation instructions that may be transmitted to vehicles in the environment.

In operation 132, the map data system 102 may perform the updates to the map data and/or updates to various vehicle data, based on the determined cause of the disparity and/or resolution determined in operation 120. In some examples, a resolution to a disparity determined by the map data system 102 may include updating the current map data for an object, using automated processes and/or user interface-based techniques. Box 134 illustrates an example subset of object attributes for an object that may be represented in the map data. As described below in more detail, depending on the type of the disparity, the severity of the disparity, and/or the cause of the disparity determined in operation 120, the map data system 102 may initiate a process to automatically update the map data, and/or may generate a user interface to allow a user to review and modify the existing map data for the object to comport the object as perceived in the vehicle sensor data.

In some cases, the map data system 102 may cause a lock to be implemented for the portion of the map data corresponding to the location of the disparity. For example, a map data lock may be applied to a particular region of the map data in response to the detection of a topology disparity (e.g., a new object detected in the environment) and/or for significant policy disparities and/or alignment disparities. Map data locks may be applied to prevent the triggering of processes configured to automatically update the map data, and/or may prevent users other than certain predetermined and authorized users from making changes via a user interface to the locked portions of the map data. Additional techniques and examples for locking specific regions of map data to prevent changes until certain authorized users can generate, review, and/or approve of the map data updates are described, for example, in U.S. patent application Ser. No. 17/555,186, filed Dec. 17, 2021, and entitled "Collaborative Road Network Access," the entire contents of which are incorporated herein by reference for all purposes.

To resolve and/or mitigate the disparity between perceived objects in the environment and the map data, the map data system 102 also may transmit data including driving/navigation instructions to vehicles in the environment. Such driving/navigation instructions may include additional data other than updated map data, for example, data that may be provided to some vehicles before the updated map data has been generated and/or in lieu of updated map data. For instance, prior to generating the updated map data to address a disparity, the map data may transmit the location of the disparity (and/or an object description) to vehicles near the location, with instructions for the vehicles to avoid the location, take an alternate route, or traverse more cautiously when driving near the location.

Further, in some cases, the updates performed in operation 132 to resolve the disparity also may include transmitting sensor configuration data to the vehicle from which the sensor data was received and/or other vehicles. For instance, when determining that the likely cause of the disparity is the localization error of the vehicle, the map data system 102 may transmit updated localization error data (e.g., an amount and/or direction of the localization error) to the vehicle from which the sensor data was received (and/or other vehicles having similar sensor configurations) to allow the vehicle to correct or otherwise account for the localization error during subsequent driving maneuvers (including avoiding the particular area, driving more conservatively in the area, discounting/down-weighting data associated with such objects, and the like). In other examples, the map data system 102 may transmit data to the vehicle from which the sensor data was received (and/or other vehicles) causing a sensor reconfiguration and/or recalibration on the vehicle, thereby reducing or eliminating the localization error of the vehicles.

Figure 2:
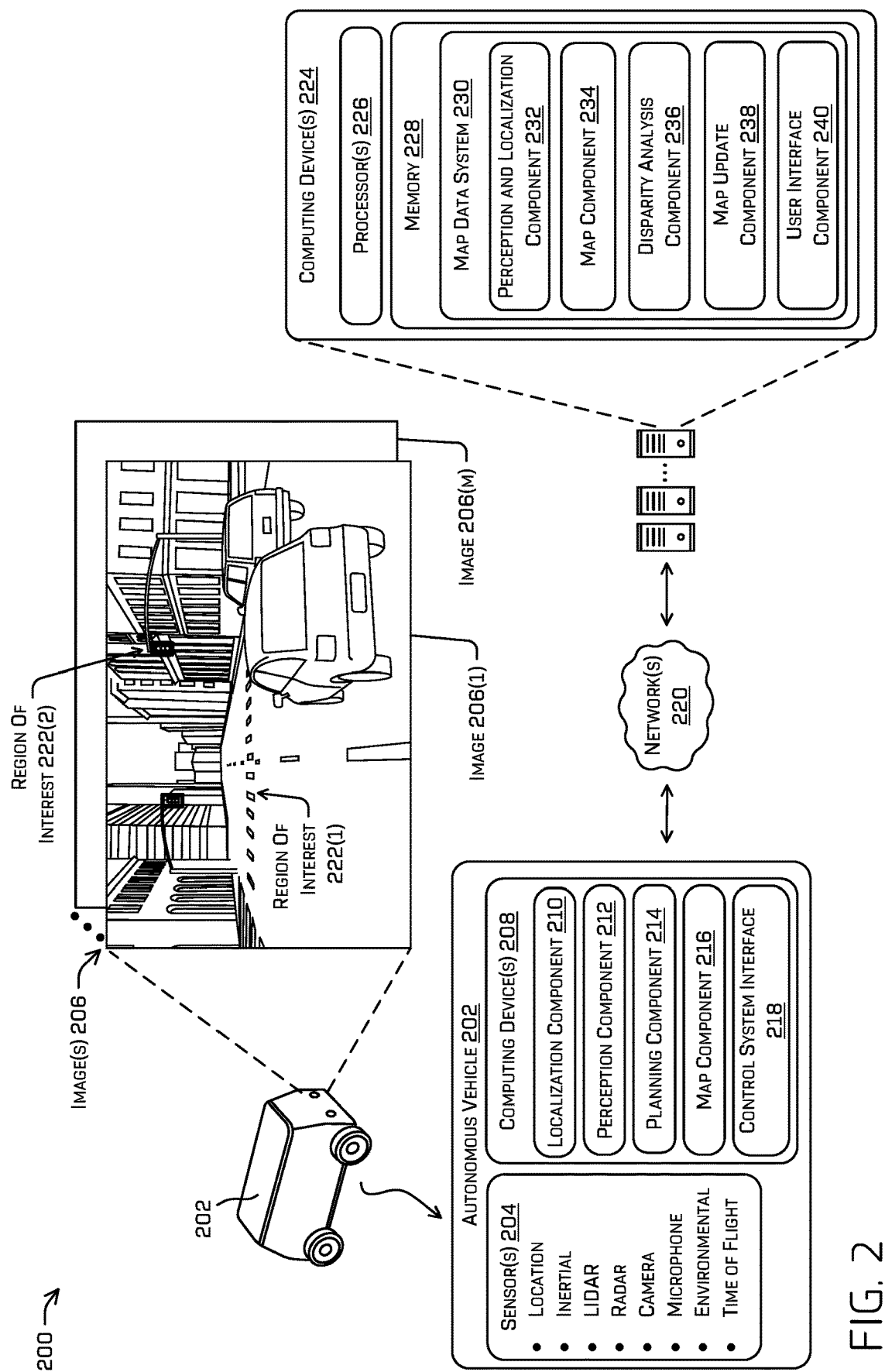
FIG. 2 is a block diagram illustrating an example autonomous vehicle system, including a vehicle and a separate computing device including a map data system, for implementing various techniques described herein.

FIG. 2 illustrates an example autonomous vehicle system 200 including an autonomous vehicle 202 and one or more separate computing devices configured to implement a map data system similar or identical to the map data system 102 described above in FIG. 1. In some instances, an autonomous vehicle 202 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the autonomous vehicle 202 may be a fully or partially autonomous vehicle having any other level or classification. Moreover, in some instances, the guidance isolation techniques described herein may be usable by non-autonomous vehicles as well. It is contemplated that the techniques discussed herein may apply to more than robotic control, such as for autonomous vehicles. For example, the techniques discussed herein may be applied to video games, manufacturing, augmented reality, etc.

According to the techniques discussed herein, the autonomous vehicle 202 may receive sensor data from sensor(s) 204 of the autonomous vehicle 202. For example, the sensor data may include a location signal (e.g., a GPS signal), an inertia signal (e.g., an accelerometer signal, a gyroscope signal, etc.), a magnetometer signal, a wheel encoder signal, a speedometer signal, a point cloud of accumulated LIDAR and/or RADAR points, an image (or images), an audio signal, and/or bariatric or other environmental signals, etc. For example, the autonomous vehicle 202 may receive image(s) 206(1) to 206(M) (collectively "images 206"), where M is any integer greater than 1, from the sensor(s) 204. As noted above, although the discussion herein primarily discusses images, for ease, it is contemplated that the techniques may be applied to any sensor data that has the capability to discretely represent an object (e.g., a lidar or radar point cloud including points that represent an object).

In some examples, the autonomous vehicle may include computing device(s) 208 that may include a localization component 210, a perception component 212, a planning component 214, a map component 216, and/or a control system interface 218.

In at least one example, the localization component 210 can include functionality to receive data from the sensor(s) 204 to determine a position of the autonomous vehicle 202 (also referred to herein as localization data). For example, the localization component 210 can include and/or request/receive a map of an environment (e.g. from the map component 216) and can continuously determine a location of the autonomous vehicle within the map (e.g. localize a position of the autonomous vehicle 202 on a global map and/or a local map). In some instances, the localization component 210 can utilize SLAM (simultaneous localization and mapping) or CLAMS (calibration, localization and mapping, simultaneously) to receive image data, LIDAR data, radar data, IMU data, GPS data, wheel encoder data, and the like to accurately determine a location of the autonomous vehicle. In some instances, the localization component 210 can provide the localization data to various components of the autonomous vehicle 202 to determine an initial position of an autonomous vehicle for generating a candidate trajectory, as discussed herein.

The perception component 212 may include one or more ML models and/or other computer-executable instructions for detecting, identifying, segmenting, classifying, and/or tracking objects from sensor data collected from the environment of the autonomous vehicle 202. In some instances, the perception component 212 may receive sensor data from sensor(s) 204 of the autonomous vehicle 202 and localization data from the localization component, determine perception data from the sensor data, and transmit the perception data to a planning component 214 for use by the planning component 214 to determine one or more trajectories, and/or control the motion of the autonomous vehicle 202 to traverse a path or route, though any such operation may be performed in various other components. In some instances, the perception data may comprise a region of interest (an "ROI") and/or a track associated with an object detected in an image. The planning component 214 may determine instructions for controlling operations of the autonomous vehicle 202 based at least in part on the ROI and/or the track.

For example, the perception component 212 may detect an object in the environment and classify the object (e.g., "traffic signal," "four-wheeled vehicle," "semi-truck," "pedestrian," "animal," "construction vehicle"). In the illustrated example, autonomous vehicle 202 may receive image(s) 206 comprising image 206(1), which includes a representation of a driving environment captured by autonomous vehicle 202. In this example, the image 206(1) may include a number of objects that the perception component 212 may identify as ROIs, including ROIs 222(1) representing a crosswalk in the driving environment and ROI 222(2) representing a traffic light in the driving environment.

In some examples, the perception component 212 may also track an object, such as the crosswalk and traffic light corresponding to ROIs 222 and/or other objects in the environment that may be represented in the map data of the environment. In some examples, a track may comprise an association between objects detected in subsequent sensor data acquisitions (e.g., from frame to frame in image data). The track may thereby be an indication that the perception component 212 is identifying two object detections as corresponding to a same object. In some examples, the track may additionally or alternatively comprise a current, predicted, and/or historical position, heading, velocity, acceleration, distance, ROI(s), and/or center of the object. In some examples, any of these characteristics may be real world values (e.g., a velocity of the object in the real world in meters per second, kilometers per hour, a heading relative to the sensor that captured the image) and/or image-relative characteristics (e.g., a velocity associated with movement of a representation of the object across images in pixels per second, a heading that identifies an angle of movement of the representation of the object in the image). Of course, the track information for an object may comprise any data structure and/or format.

In some instances, the localization component 210 may determine a position of the autonomous vehicle 202, for example, using any sensor data to localize the autonomous vehicle 202. The perception component 212 may determine data related to objects in the vicinity of the autonomous vehicle 202, route data that specifies a destination of the vehicle, global map data that identifies characteristics of roadways (e.g., features detectable in different sensor modalities useful for localizing the autonomous vehicle), local map data that identifies characteristics detected in proximity to the vehicle (e.g., locations and/or dimensions of buildings, trees, fences, fire hydrants, stop signs, and any other feature detectable in various sensor modalities), etc. In some examples, the localization component 210 may be configured to calibrate the sensor(s) utilizing SLAM (simultaneous localization and mapping) techniques and/or CLAMS (calibration, localization, and mapping, simultaneously) to receive sensor data and accurately determine a location of the autonomous vehicle, as discussed in more detail in U.S. patent application Ser. No. 15/674,853, filed Aug. 11, 2017, the entirety of which is incorporated herein. The data produced by the perception component 212 may be collectively referred to as "perception data." In some instances, the map data may be retrieved and provided by the map component 216. More particularly, based on a position of the autonomous vehicle 202, the map component 216 may load or otherwise retrieve from a memory or network global semantic map data for use by the perception component 212 in detecting and classifying objects from the images. Once the perception component 212 has identified and/or segmented objects from the image and/or determined other perception data, the perception may provide the perception data, including the object detections and/or instance segmentations, to a planning component 214.

In some instances, the planning component 214 may use perception data, including the ROIs, track, and/or segmentations (discussed further below) to generate instructions for controlling operation of the autonomous vehicle 202. For example, the planning component 214 may determine a route for the autonomous vehicle 202 from a first location to a second location; generate, substantially simultaneously, a plurality of potential trajectories for controlling motion of the autonomous vehicle 202 in accordance with a receding horizon technique (e.g., 1 micro-second, half a second, two seconds, eight seconds, etc.) and based at least in part on an ROI, track, and/or segmentation, to control the vehicle to traverse the route; and select one of the potential trajectories as a trajectory of the autonomous vehicle 202 that may be used to generate a drive control signal that may be transmitted to drive components of the autonomous vehicle 202.

As noted above, the perception component 212 may determine potential disparities between the objects perceived in the driving environment (e.g., ROIs 222) and the map data in map component 216 used by the autonomous vehicle 202 to navigate the environment. For example, the perception component 212 may determine if (1) an object detected in the image data does not correspond to an object in the map data, (2) an object in the map data is not detected in the image data; (3) an object in the image data appears to correspond to an object in the map data but has a different position/orientation (e.g., a crosswalk having a different stop line or boundary, a traffic light that has been moved or repositioned on the traffic light assembly, etc.); or (4) an object in the image data appears to correspond to an object in the map data but has a different semantic meaning or traffic directive (e.g., a speed limit sign having a different speed limit, a lane having a different directionality or lane usage identifier, etc.). In these examples, the perception component 212 may flag any detected objects in a plurality of image frames (and/or in other sensor data views) and cause the control system interface 218 to send the images of the flagged objects to the map data system 230 over one or more network(s) 220.

As described above and as discussed throughout this disclosure, the autonomous vehicle 202 may send image data and/or other sensor data to one or more computing device(s) 224, via one or more network(s) 220. In some examples, the autonomous vehicle 202 may send raw sensor data (e.g. images or other raw sensor data without metadata or identification of detected objects) to the computing device(s) 224. In other examples, the autonomous vehicle 202 can send processed sensor data and/or representations of sensor data (e.g. processed images or other processed sensor data, for example, with metadata or other additional data identifying of detected object(s) whose presence caused the images to be flagged) to the computing device(s) 224. In some cases, the autonomous vehicle 202 can send sensor data (raw or processed) to the computing device(s) 224 as one or more log files. For ease of understanding, the following discussion may refer to sensor data as image data. However, implementations are not so limited and other sensor data such as those described above may be utilized in addition or alternatively to various combinations of image data, lidar data, radar data, sonar data, etc.

In at least some examples, the autonomous vehicle 202 may detect objects in the environment (e.g., road objects, traffic objects, etc.) and/or characteristics of such objects, and may determine discrepancies between such the detected objects and the information included in the map data. The detection of such discrepancies may be used as a trigger to determine that a disparity exists, and to send data associated with the detected objects and/or location to the computing device(s) 224 for confirmation and/or validation. In certain examples, the autonomous vehicle 202 may perform one or more maneuvers based on detecting the disparity (e.g., coming to a safe stop, selecting an alternate driving route, etc.) and/or weighting the contribution of such detections up and/or down in order to continue planning a trajectory through the environment.

Additionally or alternatively, the computing device(s) 224 may be configured to detect discrepancies between the detected objects in the environment and the map data, instead of (or in addition to) the autonomous vehicle 202. For instance, the autonomous vehicle 202 may transmit raw or processed sensor data to the computing device(s) 224, which may use a perception and localization component 232 (hereinafter perception component 232) to compare the sensor data received from the autonomous vehicle 202 to the map data to determine potential disparities.

As shown in this example, the computing device(s) 224 may include various components configured to receive and analyze sensor data, detect disparities with the map data, determine causes of the disparities, and to resolve the disparities (e.g., by generating and updating the map data based on the sensor data). In at least one example, the computing device(s) 224 can include one or more processors 226 and memory 228 communicatively coupled with the one or more processors 226. In the illustrated example, the memory 228 of the computing device(s) 224 stores a map data system 230 that may include or utilize the functionality of a perception and localization component 232, a map component 234, a disparity analysis component 236, and a map data update component 238. In some examples, some or all of the components of the computing device(s) 224 described herein may be implemented within the autonomous vehicle 202 instead of or in addition to being implemented within the computing device(s) 224 separate from and external to the vehicle. Additionally, in at least one example, the computing device(s) 224 may be integrated partially or entirely into an autonomous vehicle control system managing operations of a plurality of autonomous vehicles 202.

As discussed above, the perception component 232 of the map data system 230 may perform perception processing on the sensor data (e.g., image data) received from any number of vehicles, to detect objects in the sensor data. The detected objects may be tracked over multiple image frames (e.g. multiple frames of video or multiple still image frames). The perception component 232 may further determine localization information (e.g. the location of the image capture sensor) in the coordinate system of the map data. More particularly, the localization information may localize the autonomous vehicle 202 (or image capture sensor) in the environment and may be generated using a variety of techniques (e.g., SLAM) and using potentially many types of sensor data (lidar, gps, image, IMU). The localization information may also include the pose (position, orientation, etc.) of the sensor (e.g., camera) used to capture the sensor data.

Based on the tracking and the localization information, the perception component 232 may determine a corresponding location of the object in the coordinate system of the map data. For example, based on the vehicle position and the camera pose, a UTM (universal transverse Mercator) location (or other location such as latitude and longitude) and a height associated with each pixel in image data may be determined. Over a series of frames, the perception component 232 may triangulate a position of the tracked object in the environment and determine the UTM and/or height information for each frame. In some examples, the perception component 232 may project a ray from the camera origin to each pixel in the image and triangulate the position over time. In some examples, this process may be performed without depth data. The UTM and/or height information associated with the center of the tracked object determined over the series of frames may be utilized as the determined corresponding location.

The perception component 232 also may classify detected object (e.g. as a road segment, lane, road sign, traffic signal, sidewalk, crosswalk, etc.). In some examples, the perception component 232 may perform functions similar or identical to those discussed above in reference to the perception component 212.

The map component 234 of the map data system 230 may retrieve map data provided for the environment, area or geographic location at which the image data (and/or other sensor data) was captured. In some examples, the environment, area or geographic location at which the image data was captured may be provided as metadata to the received image data or otherwise provided by the system capturing the image data. Based on the position and/or classification of the object detected by the perception component 232 and the map data provided for the environment, area or geographic location at which the image data was captured, the perception component 232 may determine whether or not the map data includes an object of the determined classification at the proposed location. Additionally, when a corresponding (or potentially corresponding) object is identified within the map data, the perception component 232 may determine whether the corresponding object includes the same object type, position, size, orientation, and/or other attributes as the object detected within the sensor data. To determine whether a potential disparity exists, any number of thresholds may be used to compare the measured (or perceived) data to the expected data based on the map data, including minimum difference thresholds for distances, orientations, sizes, etc. In some instances, different thresholds may be determined and applied based on the distance between a perceived object and the sensor, based on the relative angle of the perceived object, and/or based on the object type, etc.

In instances when an object perceived/detected based on the sensor data from the autonomous vehicle 202 does not appear in the map data, or when the perceived/detected object corresponds to an object in the map data but has a different type, location, or one or more different attributes, the disparity analysis component 236 may determine a cause of the disparity between the perceived sensor data and the map data. The disparity analysis component 236 may be similar or identical to the disparity analysis component 130 described above. Based on the cause of the disparity, the disparity analysis component 236 may further determine a proposed resolution to the disparity to be implemented within the map data system 230, the autonomous vehicle 202, and/or additional autonomous vehicles in the environment.

As discussed above, the map data system 230 may receive image data via the network(s) 220, and the map update component 238 may be configured to update maps stored by the map component 234 based on the received image data. In various examples, based on the cause and/or resolution of the disparity determined by the disparity analysis component 236, the map update component 238 may be configured to update the location of the object within the map component 234. As noted above, such updates to the location of an object in the map data may be performed automatically (e.g., without any user input) or may be performed via a user interface during which a user may review and approve of the changed location. In some examples, the map data system 230 may determine a proposed location for a new object detected in the environment and/or for an existing object to be moved within the map data, by analyzing the image frames including the view of the detected object. In some examples, the map update component 238 may perform projection by overlaying proposed location indicators and corresponding identifiers into the plurality of the images at positions in the two-dimensional image space of each image corresponding to the three-dimensional coordinates of the proposed locations of the detected objects. For example, the UTM and/or height information associated with the center of the tracked object utilized as the proposed location and projected from the 3D coordinates of the UTM and height information to a 2D location in the image space.

In this or any other example discussed herein, the map update component 238 may project the indicator into any images or video captured by any vehicle (as long as the vehicle is correctly localized in the environment). In other words, the images into which the proposed location indicators are projected may be the same images used for detection and position determination, entirely different images, or some mix thereof. Further, the images into which the proposed location indicators are projected may be captured at a different time from the images used for detection and position determination.

Although the above examples refer to updating an object location within the map data, the map update component 238 may use similar techniques to update the size, shape, and orientation of objects, based on the images and/or other sensor data of the objects detected in the sensor data. Additionally, for both newly detected objects not present within the map data and for objects previously existing within the map data, the map update component 238 may analyze the images and/or other sensor data to update the object type or classification, and/or any semantic features or driving policies associated with the object. Such determinations and updates to an object type, map topology, and/or object features may be performed automatically by the map update component 238, or using a user interface to allow a user to review and approve of the updates before they are committed into the map component 234.

After a change to the map data has been determined by the map update component 238, the change may be entered automatically into the map data via the map component 234, or may be reviewed and approved by a user via the user interface component 240. In some examples, the user interface component 240 may display the image frames including location indicator(s) and/or any updated annotation/labeling data for the object to a reviewing user. The reviewing user may provide feedback regarding the location indicators and annotations/labels to the user interface component 240. For example, the reviewing user may provide feedback accepting or rejecting proposed locations, or changing object labels within the user interface indicating the object type, features, etc. In the case of a previous location indicator and/or previous object annotations/labels, the reviewing user may provide feedback confirming or denying that the object in the map data is no longer present at the previous location and/or that the previous object labels are no longer accurate.

Based on the feedback received via the user interface and/or the automatic determinations of the map update component 238, the map component 234 may add objects to the map data and update existing objects in the map data. The added and updated objects may be added into the map data at the determined locations and including the determined object types, features, annotations, etc. In a case in which an object is determined to be no longer present at the previous location, the map component 234 may be configured to remove the object from the map data. Where a location is rejected, the reviewing user may request additional proposed locations for objects whose proposed location was rejected (e.g. based on additional image data). In some implementations, a control system, of which the map data system 230 may be a part, may instruct one or more autonomous vehicles to travel to the location of the objects of interest to capture the additional image data.

While the example system to FIG. 2 operates based on image data captured by autonomous vehicles, implementations are not so limited and the source of the image data may vary. Other variations or features may be incorporated into some embodiments. For example, some embodiments may incorporate a filtering functionality configured to determine a difference between the captured data regarding the new, missing or changed object(s) and the existing map data. The filtering functionality may determine whether the difference is above a threshold and discard or otherwise not perform the projection and review processes when the difference is below the threshold. This may reduce the number of false positives caused by issues such as miscalibrated sensors or similar factors.

Moreover, while the examples discussed herein relate to projecting a position indictor into image data, embodiments are not so limited. For example, in addition or alternatively, the map update component 238 may determine other information into the image. Some other non-limiting types of information which may projected into the image may include extents, dimensions and orientations, states of the detected objects, etc. For example, the orientation information may include yaw, pitch and roll of a detected object such as a road segment, lane, traffic light, road sign, crosswalk, etc. In a specific example, the yaw of an object may be projected into the image to aid the reviewing user in determining the incoming road or lane associated with the object.

Figure 3:
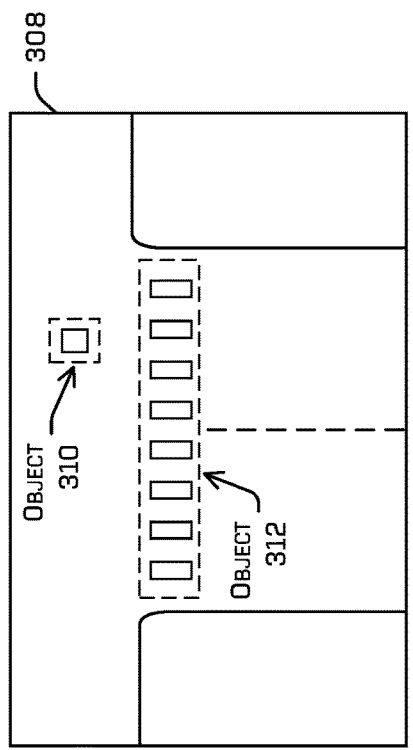
FIG. 3 illustrates an example driving scene image based on vehicle sensor data and corresponding map data, in accordance with one or more implementations of the disclosure.
Figure 3:
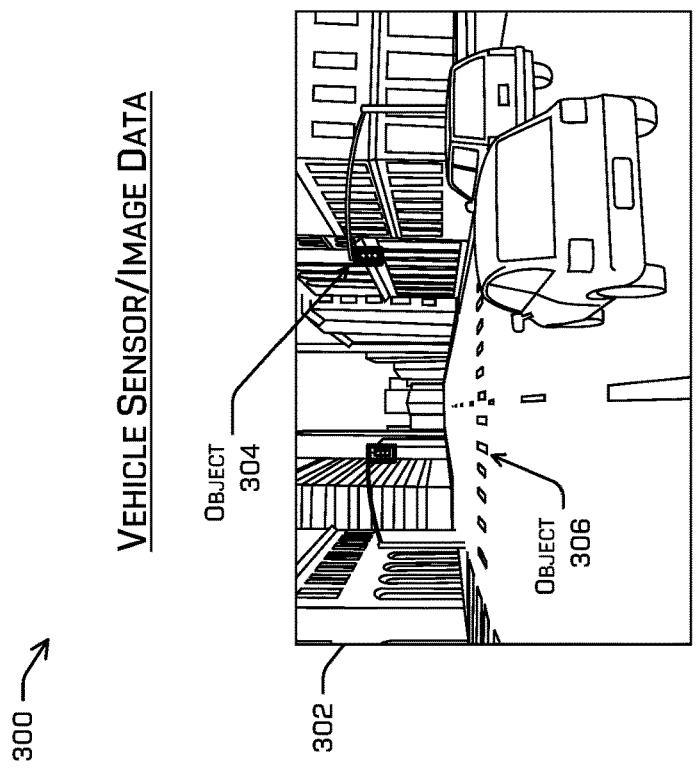

FIG. 3 shows a diagram 300 illustrating a comparison between a driving scene captured by vehicle sensors and corresponding map data of the same location. In this example, an image frame 302 may represent an imaged captured by a vehicle traversing a driving environment. The image frame 302 in this example depicts a number of objects, including both fixed and long-lived objects that may be represented in the map data of the environment, such as the traffic light object 304 and the crosswalk object 306, as well as dynamic or impermanent objects that would not be represented in the map data (e.g., vehicles, pedestrians, etc.).

In this example, after receiving the image frame 302 from a vehicle (or other sensor system) in the environment, a map data system (e.g., map data system 102 and/or map data system 230) may compare the objects represented in the image frame 302 to the corresponding objects, if any, at the same location in the map data. In this example, map 308 may correspond to a portion of the current map data stored by the map data system 230. For illustrative purposes, the map 308 is represented as a top-down view of the environment, depicting points or boundaries for any map objects, as well as annotations/labels indicating the object type and various attributes of the map objects though any other format is contemplated. In this example, map 308 includes a map object 310 corresponding to the traffic light object 304 detected in the vehicle sensor data, and a second map object 312 corresponding to the crosswalk object 306 detected in the vehicle sensor data.

After receiving the image frame 302 and the corresponding map 308, the map data system 230 may automatically compare the locations, sizes, types, and/or other attributes of the various objects represented in both. In this case, the map data system 230 may determine that the map object 310 corresponds to the traffic light object 304, and that second map object 312 corresponds to the crosswalk object 306. After determining that a corresponding object is present in the map data, the map data system 230 may further analyze the image data to compare perceived object attributes (e.g., location, size, type, orientation, etc.) to the attributes of the corresponding map object. In this example, a first object attribute table 314 depicts an example set of attributes for the traffic light object 304, based on the analysis of the image frame 302 and/or other sensor data. The map data system 230 may compare the object type, location, and orientation in the first object attribute table 314, to the object type, location, and orientation of the corresponding map object 310 in the second object attribute table 316. In this example, the map data system 230 may compare first object attribute table 314 and second object attribute table 316 to determine that a disparity exists between the location and the orientation of the map object 310 relative to the corresponding location and orientation of the perceived traffic light object 304.

Figure 4:
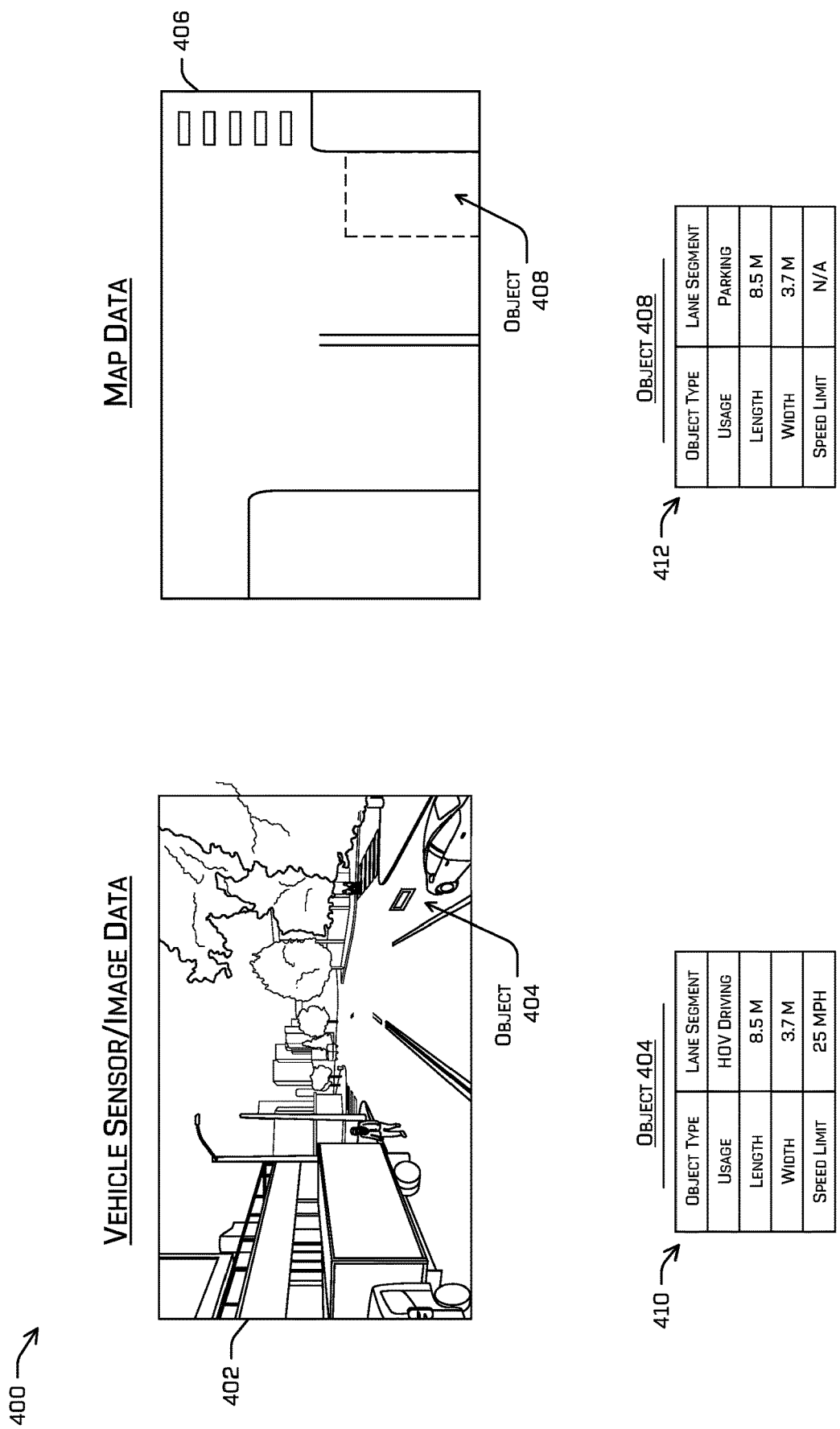
FIG. 4 illustrates another example driving scene image based on vehicle sensor data and corresponding map data, in accordance with one or more implementations of the disclosure.

FIG. 4 shows a diagram 400 illustrating another comparison between a driving scene captured by vehicle sensors and corresponding map data of the same location. In this example, an image frame 402 depicts a different driving scene with a number of fixed objects and dynamic/impermanent objects in the environment. Among the fixed objects is included a driving lane object 404, which, based on the lane markings and the other vehicles driving in the lane, may be identified as an HOV driving lane. After receiving the image frame 402 from the vehicle, the map data system 230 may compare the objects represented in the image frame 402 to the corresponding objects in the map data. In this example, map 406 may correspond to the portion of the current map data stored by the map data system 230 representing the same location. In this example, map 406 includes a map object 408 corresponding to the driving lane object 404 detected in the vehicle sensor data.

In this example, after receiving the image frame 402 and the corresponding map 406, the map data system 230 may automatically compare the locations, sizes, types, and/or other attributes of the various objects represented in both. In this case, the map data system 230 may determine that the map object 408 corresponds to the driving lane object 404. The map data system 230 then may further analyze the image data to determine perceived attributes of the driving lane object 404, and may compare the attributes to the attributes of the corresponding map object 408. In this example, a first object attribute table 410 depicts an example set of attributes for the driving lane object 404, based on the analysis of the image frame 402 and/or other sensor data. The map data system 230 may compare the object type, location, size, orientation, and/or policy directives (e.g., directionality, speed limit, permissibility, hours restrictions, etc.) in the table 410, to the same attributes of the corresponding map object 408 in the second object attribute table 412. In this example, the map data system 230 may compare table 410 and table 412 to determine that a disparity exists between the types and usage of the driving lane, which is labeled as a parking lane in the map data but is determined to be an HOV driving lane based on the vehicle sensor data.

The above examples shown in FIGS. 3-4 illustrate techniques for determining disparities between objects detected in vehicle sensor data and corresponding map data objects. In such examples, after the map data system 230 determines that disparities exist between detected objects and the corresponding map data, the map data system 230 may use the various techniques described herein to determine potential causes of the disparities and/or resolutions to the disparities. As discussed above, the potential causes of a disparity may include errors or inaccuracies within the map data, localization errors or sensor calibration errors on the vehicle that captured the image data, and/or changes in the physical environment. Depending on the determined causes and/or resolutions of the disparity, the map data system 230 may initiate one or more processes (e.g., automated updates and/or user interfaces) to update the map data and/or to resolve or mitigate localization and sensor errors at the vehicle. As noted above, the map data system 230 also may determine and transmit vehicle navigation instructions to the vehicle from which the sensor data was received and/or other vehicles in the environment, based on the detected disparity. The techniques for determining potential causes and/or resolutions associated with a disparity are described further below in reference to FIGS. 5-8.

Additionally although this example illustrates updating the map object location and/or attributes for an existing map object in the map data, similar or identical techniques can be performed to add a new map object into the map data when a new object is detected in the vehicle sensor data that was not previously represented in the map data. Similar techniques also can be performed to remove map objects from the map data in response to determining based on the sensor data from one or more vehicles that the corresponding real-world object has been altered or removed from the physical environment. Additionally, although these examples depict a single image frame, as described above, in other examples the sensor data received from the vehicle may include multiple image frames depicting the same objects or same location, and/or may include various different types or modalities of sensor data (e.g., lidar, radar, sonar, etc.). Additionally, in some examples, a map data system 230 may receive and analyze sensor data from multiple image frames from a single vehicle and/or frames from multiple vehicles to determine disparities between detected objects and corresponding map data. For instance, multiple image frames from a vehicle may analyzed in which an object is occluded in one or more frames but visible in additional frames. In such examples, the map data system 230 may identify the occlusion and exclude the occluded frames from the determination of the perceived object data. Additionally or alternatively, the map data system 230 may receive and use image frames captured by different vehicles that depict the same object. For instance, different vehicles may capture sensor data of a same object from different distances, directions, or angles, etc., and the map data system 230 may analyze the different sensor data to determine more accurately the object type, location, size, orientation, color, etc.

Figure 5:
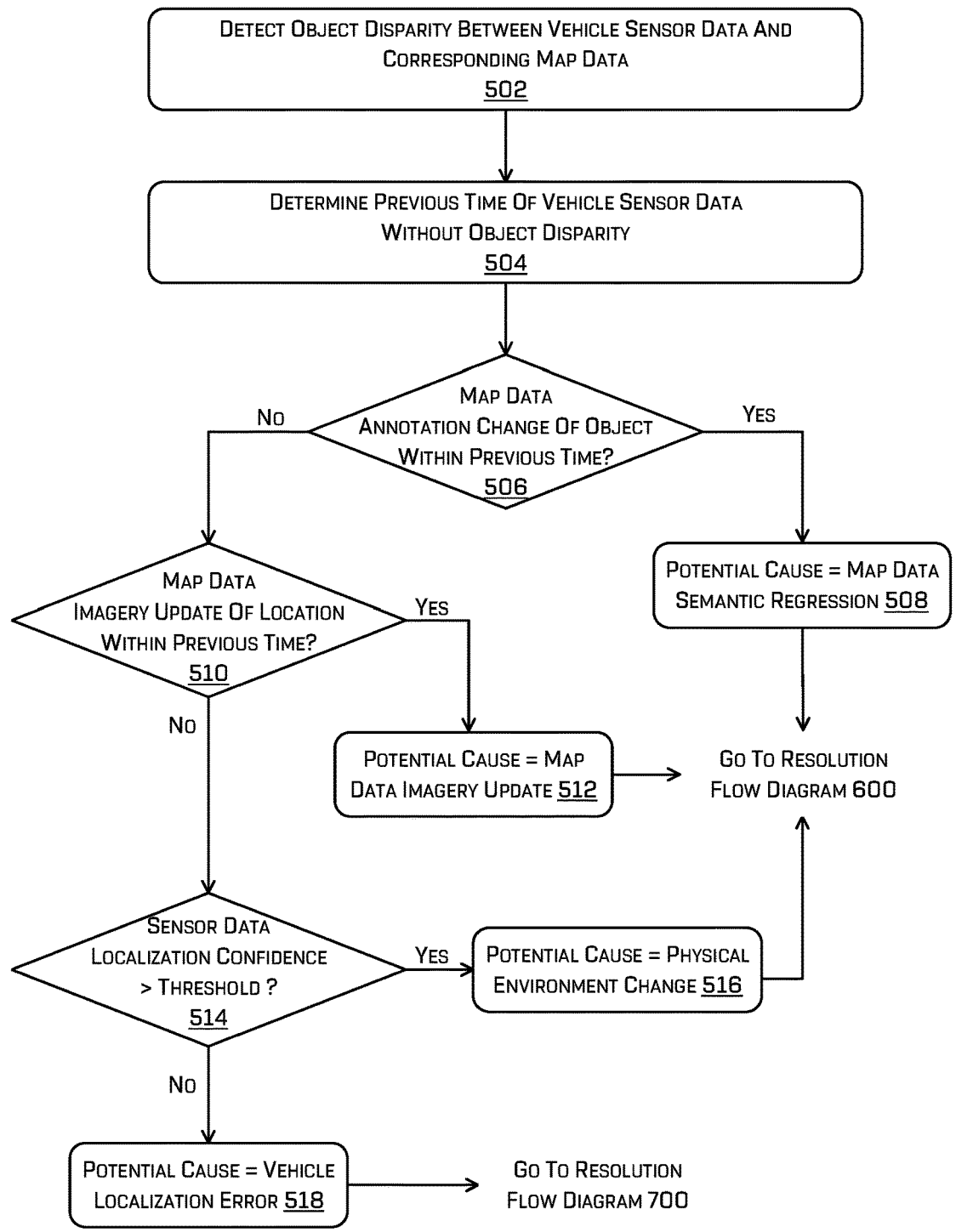
FIG. 5 is a flow diagram illustrating an example process of determining potential causes associated with disparities between vehicle sensor data and corresponding map data, in accordance with one or more implementations of the disclosure.

FIG. 5 is a flow diagram illustrating an example process 500 for determining a cause of a disparity between vehicle sensor data and the corresponding map data. In some examples, the operations of process 500 may be performed by a centralized computing system, such as map data system 102 and/or map data system 230, that is configured to maintain and update map data used to control a number of vehicles operating in an environment. Additionally or alternatively, some or all of the operations of process 500 may be performed by one or more of the autonomous vehicles (or other sensor systems) in the environment.

At operation 502, the map data system 230 may determine that a disparity exists between an object detected in an environment and the corresponding map data stored for the environment. In various examples, detecting a disparity between vehicle sensor data and the map data may be performed by an autonomous vehicle 202, by the map data system 230, and/or by a combination of the autonomous vehicle 202 and/or the map data system 230. For instance, to determine a potential disparity, the map data system 230 may receive sensor data (e.g., a set of images) depicting an object or group of objects in the environment. The map data system 230 may analyze the sensor data to determine the object type, locations and/or attributes (e.g., size, boundaries, orientation/yaw, etc.), and may compare the detected object to the map data to determine whether or not a corresponding object is present within the map data. A disparity detected in operation 502 may indicate any of various types of differences or discrepancies between the perceived object data and the map data, such as if an object detected in the sensor data does not correspond to an object in the map data, if an object in the map data is not detected in the sensor data, if an object in the sensor data appears at a different location in the map data, or if an object in the sensor data has different semantic features or other attributes than the corresponding object in the map data.

At operation 504, the map data system 230 may determine a previous time at which previous vehicle sensor data was captured of the environment. In particular, the map data system 230 may determine a most recent time when previous sensor data was captured or acquired including the same object associated with the disparity and/or the same location, and in which the previous sensor data did not result in the detection of a disparity.

At operation 506, the map data system 230 may determine whether the relevant portion of the map data (e.g., the portion of the map data associated with the disparity) has been annotated (or labeled) more recently than the previous sensor data capture time determined in operation 504. When the map data system 230 determines, based on the time comparison, that the semantic annotations of the map data have been updated more recently than the previous sensor data capture time when no disparity was detected, then the map data system 230 may determine that the cause of the disparity may be a semantic regression caused by the map data labeling/annotation change (506: Yes). In this case, to resolve the disparity, the map data system 230 may update the map data annotations in operation 508 to correct the semantic regression, using disparity resolution techniques described below in process 600.

In other examples, when the map data system 230 determines that the semantic annotations of the map data have not been updated more recently than the previous sensor data capture time when no disparity was detected (506: No), then the map data system 230 may determine that the cause of the disparity is not a semantic regression. In such examples, in operation 510, the map data system 230 may determine whether the underlying imagery for the relevant portion of the map data has been updated more recently than the previous sensor data capture time determined in operation 504. When the map data system 230 determines, based on the time comparison, that the map imagery has been updated (and/or a map element warping process has been performed) at the location associated with the disparity, then the map data system 230 may determine that the cause of the disparity may be the map imagery update and/or map element warping process (510: Yes). In this case, to resolve the disparity, the map data system 230 may update the map data in operation 512 to address any map data inaccuracies introduced by the map imagery update and/or map element warping, using disparity resolution techniques described below in process 600.

In other examples, when the map data system 230 determines that the map imagery has not been updated more recently than the previous sensor data capture time when no disparity was detected (510: No), then the map data system 230 may determine that the cause of the disparity is not a map data imagery update and/or the associated map element warping. In such examples, in operation 514, the map data system 230 may determine whether the vehicle sensor data indicates a relatively high confidence in the sensor calibration/tracking systems of the vehicle that acquired the sensor data (e.g., which may correspond to a low localization error). When the confidence level associated with the accuracy of the sensor calibration/tracking systems (and the corresponding confidence of a low localization error) is greater than a confidence threshold (514: Yes), then the map data system 230 may determine that the cause of the disparity is not the vehicle localization error. In these examples, in operation 516, the map data system 230 may determine that the disparity was caused by changes to the physical environment itself, such as the construction of new objects or the alteration of existing objects in the environment. In such examples, to resolve the disparity, the map data system 230 may update the map data annotations in operation 516 to correspond to the physical environment changes, using disparity resolution techniques described below in process 600.

Continuing with this example, when the confidence level associated with the accuracy of the sensor calibration/tracking systems (and the corresponding confidence of a low localization error) is lower than the confidence threshold (514: No), then in operation 518 the map data system 230 may determine that the likely cause of the disparity is localization error caused by the sensor configuration and/or calibration of the vehicle sensors used to acquire the sensor data. In such examples, to resolve the disparity the map data system 230 need not update the map data, but instead may perform one or more vehicle-centric disparity resolution techniques described below in process 700.

Figure 6:
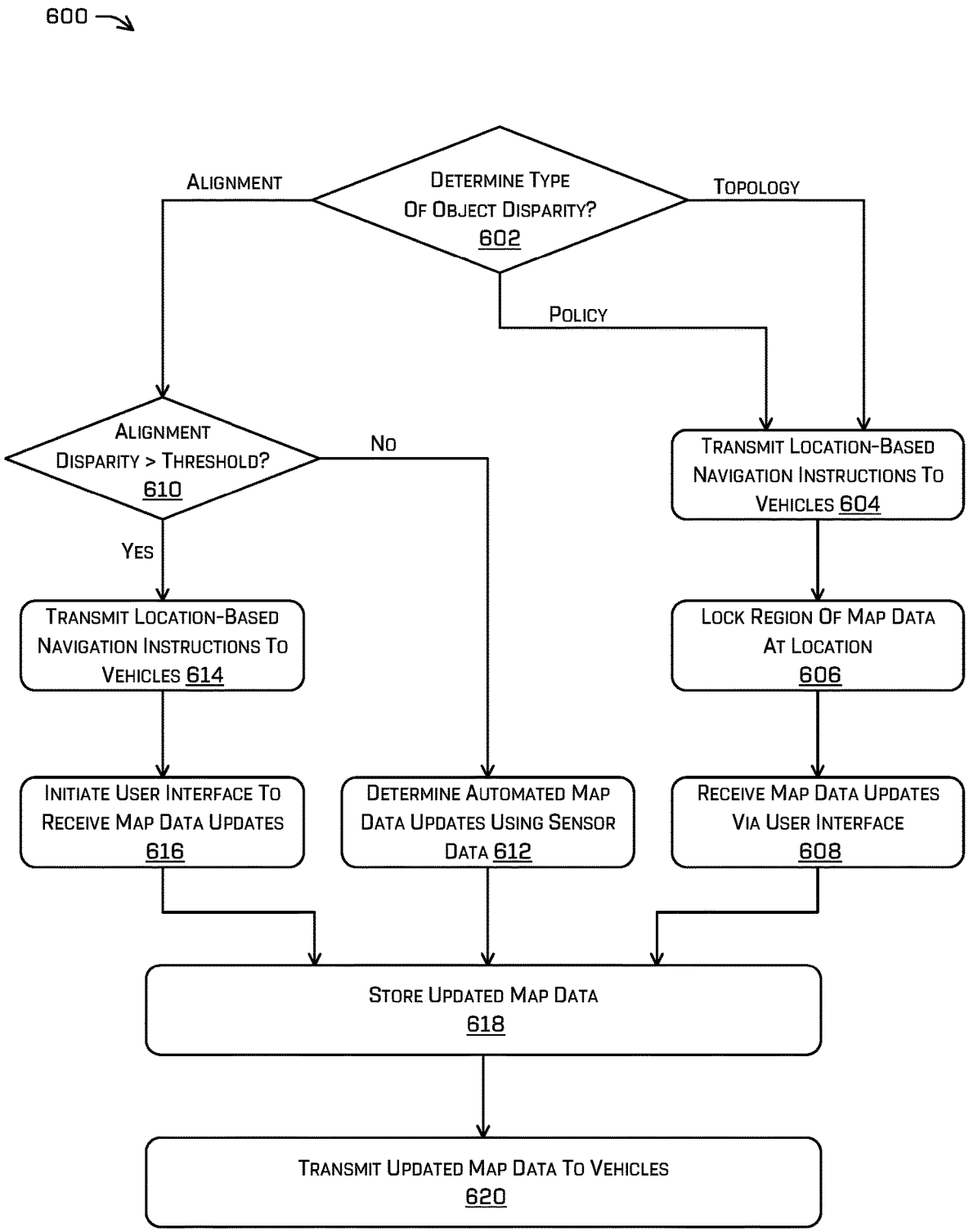
FIG. 6 is a flow diagram illustrating an example process of determining and resolving, based on a determined cause, a disparity between vehicle sensor data and corresponding map data, in accordance with one or more implementations of the disclosure.
Figure 7:
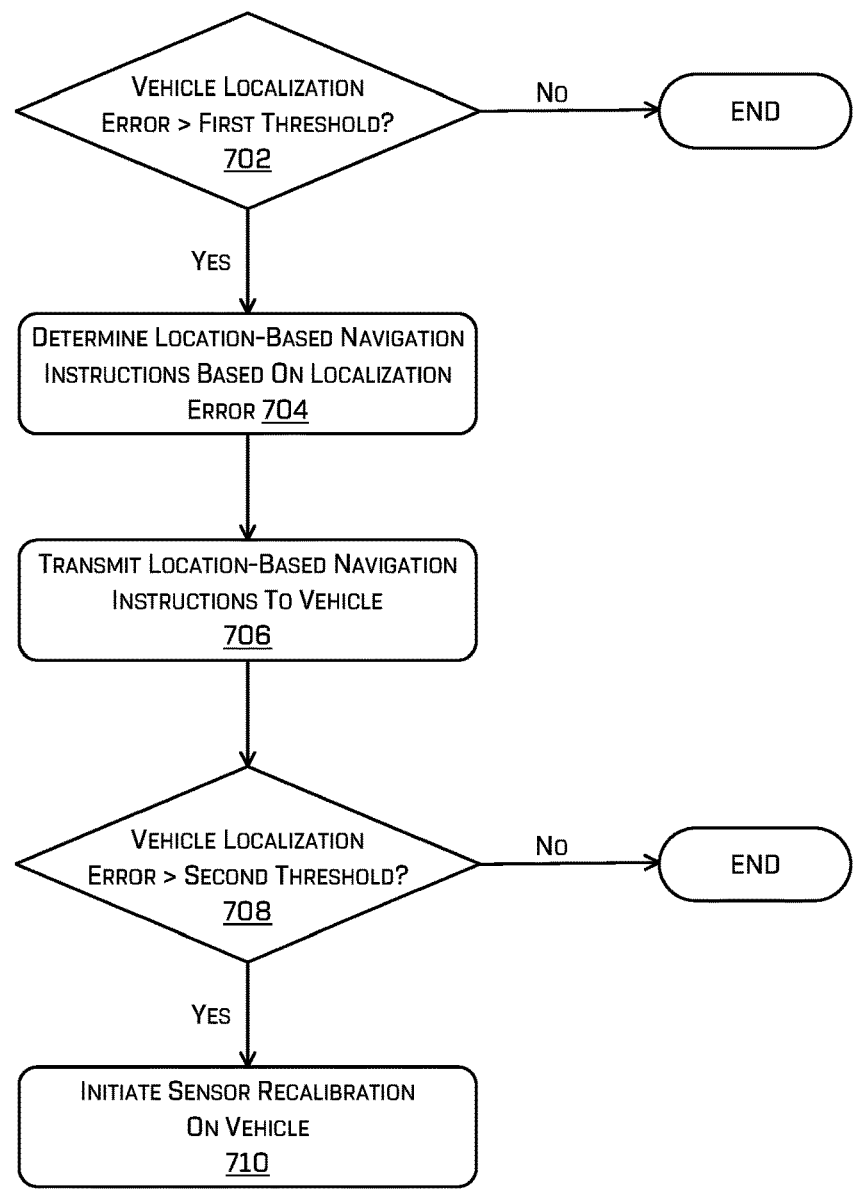
FIG. 7 is a flow diagram illustrating another example process of determining and resolving, based on a determined cause, a disparity between vehicle sensor data and corresponding map data, in accordance with one or more implementations of the disclosure.

In at least some examples, the map data system 230 may determine a resolution to address and/or mitigate the disparity between the sensor data and the map data. A resolution may include one or more actions to be performed on the map data system 230 and/or on one or more vehicles configured to operate in the environment. FIGS. 6-7, described in more detail below, include two different flow charts that may be used to determine a resolution for a disparity, based on the cause, type, and/or severity of the disparity. The flow chart in FIG. 6 may be used when the map data system 230 determines that a disparity is caused, at least in part, by errors or inaccuracies in the map data. For instance, the flow diagram in FIG. 6 and/or similar techniques may be performed when the map data system 230 determines the cause of a disparity is a semantic regression in which incorrect annotations or labels have been added to the map data, when map data inaccuracies have been introduced by a map imagery update and/or map element warping, and/or when changes have occurred in the physical environment. In these instances, the resolution may include, at least in part, updating the current map data maintained by the map data system 230. Additionally or alternatively, the flow chart in FIG. 7 may be used when the map data system 230 determines that a disparity is caused, at least in part, by localization errors by the vehicle that acquired the sensor data. In these cases, the map data system 230 may perform process 700 and/or similar techniques, and the resolution may include, at least in part, transmitting data to the vehicle that acquired the sensor data.

FIG. 6 is a flow diagram illustrating an example process 600 for determining and performing a resolution for a disparity between vehicle sensor data and the corresponding map data. In some cases, the map data system 230 may perform a process similar or identical to process 600 when the determined cause for the disparity includes errors or inaccuracies in the map data. The different possible resolutions determined in process 600 may include using various techniques to update the map data maintained by the map data system 230, including performing automated map updates and/or initiating a user interface to receive review and approval of map updates from an authorized user. In various examples, the resolutions determined in process 600 also may include actions such as transmitting location-based navigation instructions to the vehicles, in addition to or in lieu of performing map data updates.

At operation 602, the map data system 230 may determine a type of a disparity that has been detected between the sensor data received from one or more vehicles in the environment, and the map data corresponding to the environment. As discussed above, disparities may include topology disparities (e.g., when an object or object feature detected in the vehicle sensor data does not appear in the map data, or vice versa), alignment disparities (e.g., when an object or object feature detected in the vehicle sensor data appears at a different location and/or different orientation than in the map data), and policy disparities (e.g., when an object or object feature detected in the vehicle sensor data has a different semantic meaning or traffic directive than in the map data). In various examples, the map data system 230 may determine partially or entirely different resolution actions to perform depending on the type of a detected disparity.

In this example, if the detected disparity is a topology disparity or a policy disparity, then in operation 604, the map data system 230 may initially transmit location-based navigation instructions to one or more vehicles in the environment. For example, due to the detection of a disparity associated with an object or location, the map data system 230 may determine that other vehicles relying on the same inaccurate map data should avoid the driving near the object or location. In operation 604, the map data system 230 may determine any number of additional vehicles that are using in the vicinity of the object or location of the disparity, and that may be using similar or identical inaccurate map data including the disparity. For any such vehicles, before the map data can be updated and transmitted out to the vehicles, the map data system 230 may transmit instructions for the vehicles to avoid the location of the disparity, avoid using or interacting with the object for which the disparity was detected, etc.

Additionally, for topology disparities or policy disparities detected in this example, in operation 606 map data system 230 may cause a lock to be implemented for the portion of the map data corresponding to the location of the disparity. As described above, a lock may be used by the map data system 230 to prevent automated and/or user-interface based updates to certain portions of the map data, until the updates can be determined, reviewed, and/or approved by particular authorized users responsible for maintaining the map data.

In this example, after locking a region of the map data containing the disparity, the map data system 230 may generate and provide the user interface of the region, and may receive map updates from one or more users via the user interface in operation 608. The map updates received in operation 608 may include user input received via the user interface indicating new boundaries or locations for an object within a top-down representation of the map data, new or updated attributes of the objects (e.g., an updated object type, orientation, usage policy, permissibility, etc.).

To the contrary, in this example, if the map data system 230 determines that the disparity is an alignment disparity, then in operation 610 the map data system 230 determines the severity (e.g., misalignment amount or distance) of the disparity. For minor alignment disparities that are below a threshold misalignment amount (610: No), the map data system 230 may automatically determine map data updates in operation 612 to correct the misalignments in the map data. In contrast, for larger alignment disparities that are greater than the misalignment threshold (610: Yes), the map data system 230 may transmit location-based navigation instructions to one or more vehicles in the environment in operation 614, and may initiate a user interface to receive map data updates to correct the alignment disparities in operation 616. In this example, operation 614 may be similar or identical to operation 604, and operation 616 may be similar or identical to operation 608.

As these examples illustrate, the map data system 230 may use any combination of the cause, the type, and/or the severity of a detected disparity (or a combination of disparities), to determine and implement a resolution to the disparity. For instance, in the above example a region lock to the map data (e.g., in operation 606) may be applied only when the disparity is a topology disparity or a policy disparity, but not for alignment disparities. Additionally, in the above example, for the small alignment disparities the map data system 230 does not send navigation instructions to vehicles to avoid the disparity object or location, but such instructions are sent for topology or policy disparities and for larger alignment disparities. Finally, in this example, small alignment disparities are corrected using an automated analysis and comparison technique between the vehicle sensor data and map data, whereas larger alignment disparities and topology or policy disparities are corrected based on input from a user interface. However, in various other examples, the map data system 230 may determine whether or not to apply a region lock to a portion of the map data, whether to automatically correct the map data or initiate a user interface, and/or whether to transmit navigation instructions to vehicles to avoid the location, can be based on any combination of the cause, type, and/or severity of a disparity between the sensor data and map data.

After determining the updates to the map data to correct the disparity, in operation 618 the map data system 230 may store the updated map data. For example, the map data system 230 may overwrite an existing portion of the map data stored in the map component 234, in one or more versions of the map data, to include the updates to correct the disparity. In operation 620, the map data system 230 may transmit the updated map data to one or more vehicles operating in the environment. The vehicles receiving the updated map data may include the vehicle from which the sensor data was initially received and/or any other vehicle operating in the environment near the disparity. In some cases, the map data system 230 may transmit updated to map data to vehicles individually, for instance, in response to a vehicle crossing a geographic boundary near the location of the updated map data. In other cases, the map data system 230 may transmit the updated map data to a plurality (e.g., a fleet) of autonomous vehicles concurrently, regardless of the locations of the vehicles at the time when the map data is updated.

In some examples, the map data system 230 may transmit updated map data to a plurality of vehicles immediately after performing the updates. In other examples, the map data system 230 may generate an updated version of the map that includes a batch of updates made over a period of time based on sensor data received from any number of vehicles. After generating the new version of the map data, the map data system 230 may transmit the new map data including the batch of updates. In such examples, when the map data system 230 transmits special instructions to one or more vehicles to avoid the location of the disparity or to operate differently at the location (e.g., to avoid the object, to drive slower or more cautiously at the location, etc.), then in operation 620 the map data system 230 also may transmit a revocation of the special instructions concurrently with (or sometime after) providing the updated map data to the vehicles.

FIG. 7 is a flow diagram illustrating another example process 700 for determining and performing a resolution for a disparity between vehicle sensor data and the corresponding map data. As described above, the map data system 230 may perform a process similar or identical to process 700 when the determined cause for the disparity includes errors or inaccuracies in the sensor data received from the autonomous vehicle 202. As a result, the different possible resolutions determined in process 700 may include various techniques other than updating the map data maintained by the map data system 230, such as transmitting various data, navigation instructions, and/or updated sensor configurations to the vehicle from which the sensor data was received.

In the example shown in process 700, the map data system 230 may compare the amount of localization error associated with the vehicle sensor data to two separate thresholds to determine the actions to perform to correct or mitigate the localization error causing the disparity. In other examples, the map data system 230 may analyze the localization error data associated with the vehicle sensor data and may determine any number of actions to perform based on the localization error data. For instance, localization error data may include the magnitude of the accumulated localization error (e.g., in centimeters, inches, feet, etc.), the direction of the accumulated localization error (if known), and/or a level of confidence in the accumulated localization error. The map data system 230 may use any combination of localization error magnitude, direction, and/or confidence, along with additional data indicating the causes, types, and/or severities of the detected disparities to determine the resolution to be performed.

In some examples, the map data system 230 may receive the localization error data directly from the vehicle logs associated with the sensor data. For instance, the vehicle logs may include measures of the accumulated localization error and/or confidence in a vehicle localization accuracy threshold. Additionally or alternatively, the map data system 230 may independently determine the localization error by comparing various object locations and/or sizes within the vehicle sensor data to the locations/sizes of the corresponding objects in the map data.

At operation 702, the map data system 230 may determine whether the accumulated localization error for the vehicle from which the sensor data was received exceeds a first minimum threshold. In this example, if the accumulated location error is less than the first minimum threshold (702: No), then map data system 230 may determine that no action needs to be taken to notify the vehicle or address the localization error (e.g., the vehicle may continue driving nominally or according to some conservative behavior according to the magnitude of the disparity). However, if the accumulated location error is greater than the first minimum threshold (702: Yes), then in operation 704 the map data system 230 may determine a set of location-based navigation instructions based on the localization error, and in operation 706 the map data system 230 may transmit the navigation instructions to the autonomous vehicle 202. The navigation instructions transmitted in operation 706 may include data informing the vehicle of the localization error determined by the map data system 230 (e.g., the magnitude and/or direction), to allow the vehicle to self-correct or otherwise account for the localization error when performing driving maneuvers and determining trajectories.

At operation 708, the map data system 230 may further determine whether the accumulated localization error for the vehicle exceeds a second larger threshold. In this example, if the accumulated location error is less than the second larger threshold (708: No), then map data system 230 may determine that no further action needs to be taken to address the localization error. However, if the accumulated location error is greater than the second larger threshold (708: Yes), then in operation 710 the map data system 230 may initiate one or more sensor recalibration operations on the autonomous vehicle 202. In some examples, in operation 710 the map data system 230 may transmit updated sensor configuration data to the autonomous vehicle 202, and/or instructions to perform one or more sensor reconfiguration or recalibration processes. Additionally or alternatively, the map data system 230 may transmit instructions to the autonomous vehicle 202 to safely pull over and stop driving, or to drive to a service center for an inspection and servicing to correct the localization error of the vehicle.

In the examples discussed above in reference to FIGS. 5-6, the map data system 230 may determine various actions to perform to resolve a disparity detected between vehicle sensor data and the corresponding map data, based at least in part on a cause of the detected disparity. However, in other examples, the map data system 230 may determine actions to resolve a disparity without determining a cause and/or without basing the resolution on the cause.

Figure 8:
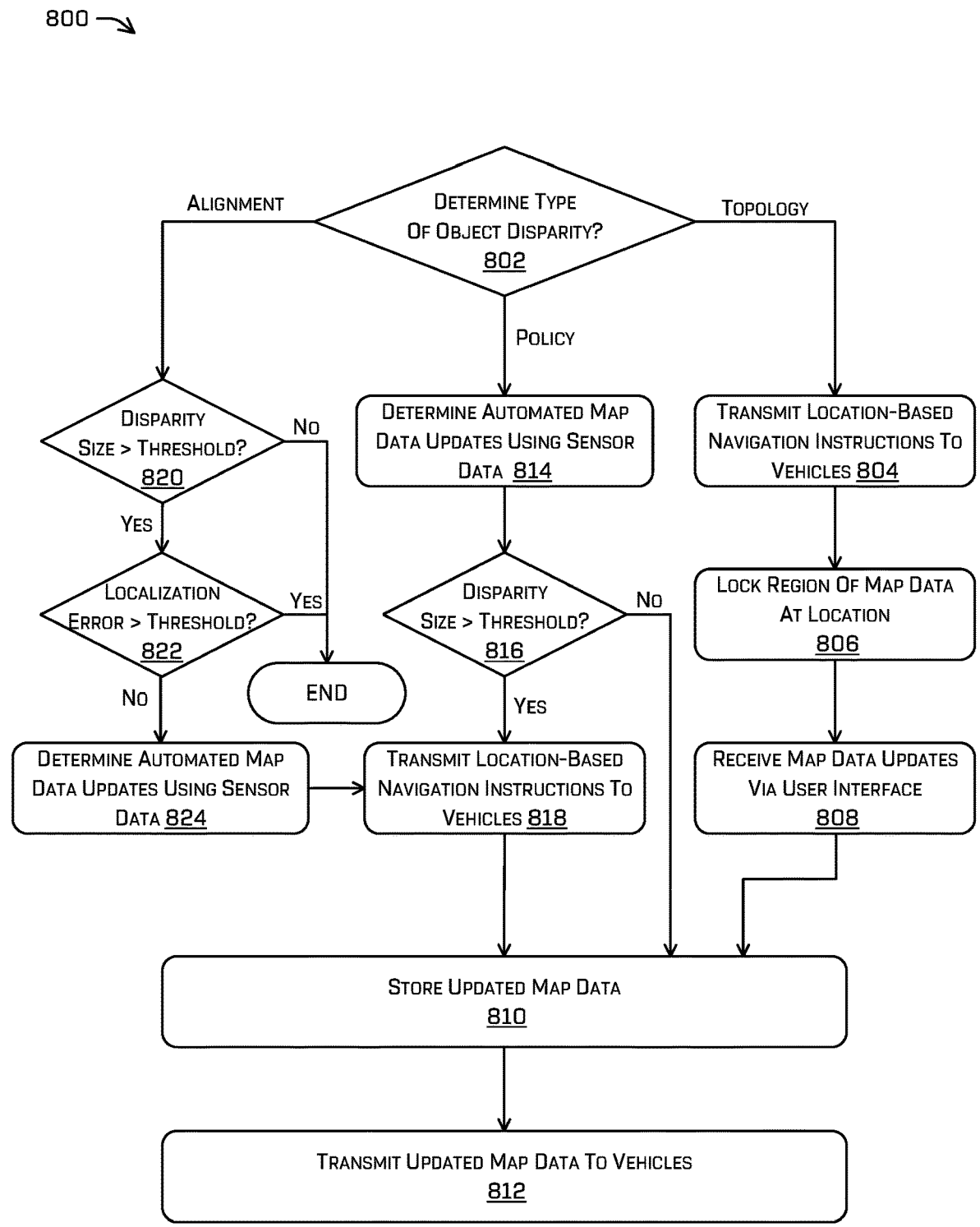
FIG. 8 is a flow diagram illustrating another example process of determining a cause and resolving a disparity between vehicle sensor data and corresponding map data, in accordance with one or more implementations of the disclosure.

For instance, FIG. 8 is a flow diagram illustrating another example process 800 determining a resolution to address or mitigate a disparity between vehicle sensor data and corresponding map data. As described below, in this example the map data system 230 may perform techniques including determining a resolution to address or mitigate a disparity, based on the type and/or severity of the disparity. The techniques described in process 800 may include determining the resolution further based in part on the cause(s), or may determine the resolution without regard to the specific cause of the disparity.

At operation 802, the map data system 230 may determine the type of the detected disparity between the sensor data and the corresponding map data. If the map data system 230 determines that the disparity is a topology disparity, then in operation 804, the map data system 230 may transmit location-based navigation instructions to one or more vehicles in the environment. In operation 806, the map data system 230 may cause a lock to be implemented for the portion of the map data corresponding to the location of the disparity. In operation 808, after locking the region of the map data including the disparity, the map data system 230 may provide a user interface and receive map updates users via the user interface. Operations 804-804 in this example may be similar or identical to operations 604-608, described above in reference to FIG. 6.

After determining the updates to the map data, in operation 810 the map data system 230 may store the updated map data in the map component 234, including updates to correct the disparity. Then, in operation 812, the map data system 230 may transmit the updated map data to one or more vehicles operating in the environment. Operations 810 and 812 in this example may be similar or identical to operations 618 and 620, described above in reference to FIG. 6.

In some examples, in operation 802, the map data system 230 may determine that the type of the detected disparity is a policy disparity. As described above, a policy disparity may include a disparity in which the detected object has a different driving policy and/or semantic meaning than the corresponding map objects. Examples of policy disparities may include, for instance, differences in road sign directives, different speed limits, different roadway permissibility directives, different lane use restriction times or HOV requirements, etc. When the map data system 230 determines that the disparity is a policy disparity, then in operation 814, the map data system 230 may automatically determine map data updates in operation 812 to correct the policy errors in the map data. Operation 814 may be similar or identical to operation 612, described above in reference to FIG. 6. Additionally, in operation 816, the map data system 230 may determine the severity of the policy disparity. For instance, a severity of a policy disparity may correspond to the amount of a speed limit disparity, a difference in lane usages and/or times, etc. For minor policy disparities that are below a threshold (816: No), the map data system 230 may proceed to store the updated map data to correct the disparity in operation 810, and to transmit the updated map data to the vehicles in operation 812. In contrast, for more severe policy disparities (e.g., larger differences in speed limit disparities, different usage directionality or permissibility, etc.) that are greater than the severity threshold (816: Yes), the map data system 230 may transmit location-based navigation instructions to one or more vehicles in the environment in operation 818, before storing and transmitting the updated map data in operation 810 and 812 respectively.

Additionally, in still other examples, in operation 802, the map data system 230 may determine that the type of the detected disparity is an alignment disparity. As described above, an alignment disparity may include a disparity in which the detected object appears at a different location and/or different orientation than the corresponding object in the map data. When the map data system 230 determines that the disparity is an alignment disparity, then in operation 820, the map data system 230 may determine the severity of the alignment disparity. For minor alignment disparities that are below a threshold misalignment amount (820: No), the map data system 230 may ignore the disparity and end the process without making any corrections to the map data. In contrast, for larger alignment disparities that are greater than the misalignment threshold (820: Yes), then in operation 822 to the map data system 230 may compare the localization error associated with the vehicle sensor data to a localization error threshold. In this example, if the accumulated location error is greater than a localization error threshold (822: Yes), then map data system 230 may determine that no action needs to be taken to address the alignment disparity. However, if the location error is less than the threshold (822: No), then in operation 824 the map data system 230 may automatically determine map data updates to correct the alignment errors in the map data. Operation 824 may be similar or identical to operation 612, described above in reference to FIG. 6. After using automated techniques to determine updated map data to correct the alignment disparity in operation 824, the map data system 230 may transmit location-based navigation instructions to one or more vehicles in the environment in operation 818, before storing and transmitting the updated map data in operation 810 and 812 respectively.

Example Clauses

A. A system comprising: one or more processors; and one or more computer-readable media storing computer-executable instructions that, when executed, cause the one or more processors to perform operations comprising: receiving vehicle sensor data associated with a first vehicle traversing an environment; determining, as object data and based at least in part on a first portion of the vehicle sensor data, one or more of an object classification or an object location of an object proximate the first vehicle; determining, based at least in part on a second portion of the vehicle sensor data, a location of the first vehicle in the environment; receiving map data associated with the location, the map data comprising one or more of an expected location of the object or an expected classification of the object; determining a disparity between the object data and the map data; determining a cause of the disparity based at least in part on at least one of: a first time associated with a previously determined object data, a second time associated with a previous update to the map data, or a localization error associated with the first vehicle; determining, based at least in part on the cause of the disparity, vehicle navigation data; and transmitting the vehicle navigation data to a second vehicle configured to be controlled based at least in part on the vehicle navigation data.

B. The system of paragraph A, wherein determining the cause of the disparity comprises at least one of: determining that a physical change has occurred at the location; determining, based at least in part on the object classification differing from the expected classification, that a labeling change has been performed to the map data associated with the location; determining that previously acquired vehicle sensor data used to generate the map data associated with the location has been changed; or determining that the localization error associated with the first vehicle is the cause of the disparity.

C. The system of paragraph A, the operations further comprising: determining updated map data associated with the location, based at least in part on the cause of the disparity; and replacing, on the second vehicle, the map data associated with the location with the updated map data.

D. The system of paragraph A, wherein determining the vehicle navigation data comprises: causing a lock to be implemented for a portion of the map data associated with the location, wherein the lock indicates that users other than a first user are to be prevented from making changes to the portion of the map data.

E. The system of paragraph A, wherein: determining the vehicle navigation data comprises determining localization error data associated with the first vehicle, and the operations further comprise performing a recalibration of a sensor associated with the vehicle sensor data.

F. A method comprising: receiving sensor data associated a location, the sensor data including a representation of an object at the location; receiving map data associated with the location, the map data comprising expected information about the object; determining, based at least in part on a portion of the sensor data, measured information about the object; determining a disparity between the expected information and the measured information; and determining a cause of the disparity based at least in part on at least one of: a first time associated with previous sensor data including a previously captured representation of the object, a second time associated with a previous update to the map data, a previous location associated with substantially no disparity, or a localization error associated with a sensor used to capture the sensor data.

G. The method of paragraph F, wherein determining the cause of the disparity comprises: determining, based at least in part on the first time and the second time, that the previous sensor data was captured more recently than the previous update to the map data; and determining, based at least in part on determining that the previous sensor data was captured more recently than the previous update to the map data, that cause of the disparity is that a physical change has occurred at the location.

H. The method of paragraph F, wherein determining the cause of the disparity comprises: determining, based at least in part on the first time and the second time, that the map data was updated more recently than the previous sensor data was captured; and determining, based at least in part on determining that the map data was updated more recently than the previous sensor data was captured, that cause of the disparity is a labeling change to the map data associated with the location.

I. The method of paragraph F, wherein determining the cause of the disparity comprises: determining a third time associated with a previous update to map imagery associated with the map data; determining, based at least in part on the first time, the second time, and the third time, that the map imagery was updated more recently than the previous sensor data was captured and more recently than the map data was updated; and determining, based at least in part on determining that the map imagery was updated more recently than the previous sensor data was captured and more recently than the map data was updated, that cause of the disparity is the previous update to the map imagery associated with the map data.

J. The method of paragraph F, wherein the disparity is a first disparity, the method further comprising: projecting the measured information and expected information into a common reference frame; determining, as the disparity, a distance between the measured information and the expected information in the common reference frame; determining, as a second disparity, a second distance between additional measured information associated with an additional object and additional expected information associated with an additional object; determining, as a first comparison, that the disparity is equal to or greater than a threshold; determining, as a second comparison, that the second disparity is less than the threshold; and determining, based at least in part on the first and second comparisons, that the cause of the disparity comprises a physical change at the location.

K. The method of paragraph F, wherein the expected information or the measured information comprise one or more of: a size of the object, a location of the object, an orientation of the object, or a classification of the object.

L. The method of paragraph F, wherein determining the disparity between the expected information and the measured information comprises at least one of: determining that the object represented in the sensor data is not included in the map data; determining that a first position associated with the object represented in the sensor data is different from a second position associated with the object in the map data; or determining that a first object classification associated with the object represented in the sensor data is different from a second object classification associated with the object in the map data.

M. The method of paragraph F, wherein a classification of the object comprises at least one of: a traffic light; a traffic sign; a lane marking; a sidewalk; or a crosswalk.

N. One or more non transitory computer readable media storing instructions executable by a processor, wherein the instructions, when executed, cause the processor to perform operations comprising: receiving sensor data associated a location, the sensor data including a representation of an object at the location; receiving map data associated with the location, the map data comprising expected information about the object; determining, based at least in part on a portion of the sensor data, measured information about the object; determining a disparity between the expected information and the measured information; and determining a cause of the disparity based at least in part on at least one of: a first time associated with previous sensor data including a previously captured representation of the object, a second time associated with a previous update to the map data, a previous location associated with substantially no disparity, or a localization error associated with a sensor used to capture the sensor data.

O. The one or more non transitory computer readable media of paragraph N, wherein determining the cause of the disparity comprises: determining, based at least in part on the first time and the second time, that the previous sensor data was captured more recently than the previous update to the map data; and determining, based at least in part on determining that the previous sensor data was captured more recently than the previous update to the map data, that cause of the disparity is that a physical change has occurred at the location.

P. The one or more non transitory computer readable media of paragraph N, wherein determining the cause of the disparity comprises: determining, based at least in part on the first time and the second time, that the map data was updated more recently than the previous sensor data was captured; and determining, based at least in part on determining that the map data was updated more recently than the previous sensor data was captured, that cause of the disparity is a labeling change to the map data associated with the location.

Q. The one or more non transitory computer readable media of paragraph N, wherein determining the cause of the disparity comprises: determining a third time associated with a previous update to map imagery associated with the map data; determining, based at least in part on the first time, the second time, and the third time, that the map imagery was updated more recently than the previous sensor data was captured and more recently than the map data was updated; and determining, based at least in part on determining that the map imagery was updated more recently than the previous sensor data was captured and more recently than the map data was updated, that cause of the disparity is the previous update to the map imagery associated with the map data.

R. The one or more non transitory computer readable media of paragraph N, wherein the disparity is a first disparity, the operations further comprising: projecting the measured information and expected information into a common reference frame; determining, as the disparity, a distance between the measured information and the expected information in the common reference frame; determining, as a second disparity, a second distance between additional measured information associated with an additional object and additional expected information associated with an additional object; determining, as a first comparison, that the disparity is equal to or greater than a threshold; determining, as a second comparison, that the second disparity is less than the threshold; and determining, based at least in part on the first and second comparisons, that the cause of the disparity comprises a physical change at the location.

S. The one or more non transitory computer readable media of paragraph N, wherein the expected information or the measured information comprise one or more of: a size of the object, a location of the object, an orientation of the object, or a classification of the object.

T. The one or more non transitory computer readable media of paragraph N, wherein determining the disparity between the expected information and the measured information comprises at least one of: determining that the object represented in the sensor data is not included in the map data; determining that a first position associated with the object represented in the sensor data is different from a second position associated with the object in the map data; or determining that a first object classification associated with the object represented in the sensor data is different from a second object classification associated with the object in the map data.

While the example clauses described above are described with respect to particular implementations, it should be understood that, in the context of this document, the content of the example clauses can be implemented via a method, device, system, a computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples may be used and that changes or alterations, such as structural changes, may be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code modules and/or computer-executable instructions executed by one or more computers or processors, hardware, or some combination thereof. Some or all of the methods may alternatively be embodied in specialized computer hardware.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art.

Many variations and modifications may be made to the above-described examples, the elements of which are to be understood as being among other acceptable examples. All such modifications and variations are intended to be included herein within the scope of this disclosure and protected by the following claims.

What is claimed is:

1. A system comprising:
one or more processors; and
one or more computer-readable media storing computer-executable instructions that, when executed, cause the one or more processors to perform operations comprising:
receiving vehicle sensor data associated with a first vehicle traversing an environment;
determining, as object data and based at least in part on a first portion of the vehicle sensor data, one or more of an object classification or an object location of an object proximate the first vehicle;
determining, based at least in part on a second portion of the vehicle sensor data, a location of the first vehicle in the environment;
receiving map data used by the vehicle and associated with the location, the map data comprising one or more of an expected location of the object or an expected classification of the object;
determining a disparity between the object data and the map data;
determining a cause of the disparity, the cause comprising one or more of:
a previous change to map imagery associated with the map data,
an error introduced during a map annotation,
a calibration error, or
a localization error;
determining, based at least in part on the cause of the disparity, vehicle navigation data; and transmitting the vehicle navigation data to a second vehicle configured to be controlled based at least in part on the vehicle navigation data.

2. The system of claim 1, the operations further comprising:
determining updated map data associated with the location, based at least in part on the cause of the disparity; and
replacing, on the second vehicle, the map data associated with the location with the updated map data.

3. The system of claim 1, wherein determining the vehicle navigation data comprises:
causing a lock to be implemented for a portion of the map data associated with the location, wherein the lock indicates that users other than a first user are to be prevented from making changes to the portion of the map data.

4. The system of claim 1, wherein:
determining the vehicle navigation data comprises determining localization error data associated with the first vehicle, and
the operations further comprise performing a recalibration of a sensor associated with the vehicle sensor data.

5. A method comprising:
receiving vehicle sensor data associated with a location, the vehicle sensor data including a representation of an object at the location;
receiving map data used by the vehicle and associated with the location, the map data comprising expected information about the object;
determining, based at least in part on a portion of the sensor data, measured information about the object;
determining a disparity between the expected information and the measured information; and
determining a cause of the disparity, the cause comprising one or more of:
a previous change to map imagery associated with the map data,
an error introduced during a map annotation,
a calibration error, or
a localization error.

6. The method of claim 5, wherein determining the cause of the disparity comprises:
determining a first time associated with previous sensor data including a previously captured representation of the object;
determining a second time associated with a previous update to the map data;
determining, based at least in part on the first time and the second time, that the previous sensor data was captured more recently than the previous update to the map data; and
determining, based at least in part on determining that the previous sensor data was captured more recently than the previous update to the map data, that cause of the disparity is that a physical change has occurred at the location.

7. The method of claim 5, wherein determining the cause of the disparity comprises:
determining a first time associated with previous sensor data including a previously captured representation of the object;
determining a second time associated with a previous update to the map data;
determining, based at least in part on the first time and the second time, that the map data was updated more recently than the previous sensor data was captured; and
determining, based at least in part on determining that the map data was updated more recently than the previous sensor data was captured, that cause of the disparity is a labeling change to the map data associated with the location.

8. The method of claim 5, wherein determining the cause of the disparity comprises:
determining a first time associated with previous sensor data including a previously captured representation of the object;
determining a second time associated with a previous update to the map data;
determining a third time associated with the previous change to the map imagery associated with the map data;
determining, based at least in part on the first time, the second time, and the third time, that the map imagery was updated more recently than the previous sensor data was captured and more recently than the map data was updated; and
determining, based at least in part on determining that the map imagery was updated more recently than the previous sensor data was captured and more recently than the map data was updated, that cause of the disparity is the previous change to the map imagery associated with the map data.

9. The method of claim 5, wherein the disparity is a first disparity, the method further comprising:
projecting the measured information and expected information into a common reference frame;
determining, as the disparity, a distance between the measured information and the expected information in the common reference frame;
determining, as a second disparity, a second distance between additional measured information associated with an additional object and additional expected information associated with the additional object;
determining, as a first comparison, that the disparity is equal to or greater than a threshold;
determining, as a second comparison, that the second disparity is less than the threshold; and
determining, based at least in part on the first and second comparisons, that the cause of the disparity comprises a physical change at the location.

10. The method of claim 5, wherein the expected information or the measured information comprise one or more of:
a size of the object,
a location of the object,
an orientation of the object, or
a classification of the object.

11. The method of claim 5, wherein determining the disparity between the expected information and the measured information comprises at least one of:
determining that the object represented in the sensor data is not included in the map data;
determining that a first position associated with the object represented in the sensor data is different from a second position associated with the object in the map data; or
determining that a first object classification associated with the object represented in the sensor data is different from a second object classification associated with the object in the map data.

12. The method of claim 5, wherein determining the cause of the disparity comprises:
determining a first previous time associated with previous sensor data captured of the object at the location;
determining a second previous time associated with an update to the map data; and
determining the cause of the disparity based at least in part on the first previous time and the second previous time.

13. The method of claim 12, wherein determining the cause of the disparity further comprises:
determining, based at least in part on the previous sensor data, previous measured information about the object; and
determining, based at least in part on the expected information and the previous measured information, that there is substantially no disparity associated with the previous sensor data.

14. The method of claim 5, wherein determining the cause of the disparity comprises:
determining, based at least in part on the sensor data, an object classification associated with the object;
determining, based at least in part on the map data, an expected classification associated with the object; and
determining, based at least in part on the object classification differing from the expected classification, that a labeling change has been performed to the map data associated with the location.

15. The method of claim 5, wherein determining the cause of the disparity comprises:
determining a first sensor used to capture the sensor data; and
determining the localization, wherein the localization error is associated with the first sensor.

16. One or more non-transitory computer-readable media storing instructions executable by a processor, wherein the instructions, when executed, cause the processor to perform operations comprising:
receiving vehicle sensor data associated with a location, the vehicle sensor data including a representation of an object at the location;
receiving map data used by the vehicle and associated with the location, the map data comprising expected information about the object;
determining, based at least in part on a portion of the sensor data, measured information about the object;
determining a disparity between the expected information and the measured information; and
determining a cause of the disparity, the cause comprising one or more of:
a previous change to map imagery associated with the map data,
an error introduced during a map annotation,
a calibration error, or
a localization error.

17. The one or more non-transitory computer-readable media of claim 16, wherein determining the cause of the disparity comprises:
determining a first time associated with previous sensor data including a previously captured representation of the object;
determining a second time associated with a previous update to the map data;
determining, based at least in part on the first time and the second time, that the previous sensor data was captured more recently than the previous update to the map data; and
determining, based at least in part on determining that the previous sensor data was captured more recently than the previous update to the map data, that cause of the disparity is that a physical change has occurred at the location.

18. The one or more non-transitory computer-readable media of claim 16, wherein determining the cause of the disparity comprises:
determining a first time associated with previous sensor data including a previously captured representation of the object;
determining a second time associated with a previous update to the map data;
determining, based at least in part on the first time and the second time, that the map data was updated more recently than the previous sensor data was captured; and
determining, based at least in part on determining that the map data was updated more recently than the previous sensor data was captured, that cause of the disparity is a labeling change to the map data associated with the location.

19. The one or more non-transitory computer-readable media of claim 16, wherein determining the cause of the disparity comprises:
determining a first time associated with previous sensor data including a previously captured representation of the object;
determining a second time associated with a previous update to the map data;

determining a third time associated with the previous change to the map imagery associated with the map data;

determining, based at least in part on the first time, the second time, and the third time, that the map imagery was updated more recently than the previous sensor data was captured and more recently than the map data was updated; and determining, based at least in part on determining that the map imagery was updated more recently than the previous sensor data was captured and more recently than the map data was updated, that cause of the disparity is the previous update to the map imagery associated with the map data.

20. The one or more non-transitory computer-readable media of claim 16, wherein the disparity is a first disparity, the operations further comprising:

projecting the measured information and expected information into a common reference frame;

determining, as the disparity, a distance between the measured information and the expected information in the common reference frame;

determining, as a second disparity, a second distance between additional measured information associated with an additional object and additional expected information associated with the additional object;

determining, as a first comparison, that the disparity is equal to or greater than a threshold;

determining, as a second comparison, that the second disparity is less than the threshold; and determining, based at least in part on the first and second comparisons, that the cause of the disparity comprises a physical change at the location.

* * * * *